(12) United States Patent
Katakura et al.

(10) Patent No.: US 6,522,391 B2
(45) Date of Patent: Feb. 18, 2003

(54) IMAGE READING APPARATUS

(75) Inventors: Kazuhiko Katakura, Kanagawa (JP); Tatsuya Konagaya, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/927,369

(22) Filed: Aug. 13, 2001

(65) Prior Publication Data

US 2001/0055105 A1 Dec. 27, 2001

Related U.S. Application Data

(63) Continuation of application No. 09/391,194, filed on Sep. 7, 1999.

(30) Foreign Application Priority Data

Sep. 7, 1998 (JP) .............................. 10-252478
Jul. 16, 1999 (JP) .............................. 11-203693

(51) Int. Cl.[7] .................... G03B 27/34; G03B 27/52; G03B 27/54; G03B 27/32; H04N 5/253
(52) U.S. Cl. ..................... 355/56; 355/40; 355/67; 355/77; 348/96; 348/97
(58) Field of Search ............... 355/56, 67, 77, 355/40; 348/97, 96

(56) References Cited

U.S. PATENT DOCUMENTS

| 4,782,365 | A | * | 11/1988 | Takagi |
| 5,036,353 | A | * | 7/1991 | Sakamoto |
| 5,424,802 | A | * | 6/1995 | Saita |
| 5,463,445 | A | * | 10/1995 | Suzuki |
| 5,475,493 | A | * | 12/1995 | Yamana ....................... 355/77 |
| 5,805,206 | A | | 9/1998 | Yokonuma et al. ........... 348/96 |
| 5,841,518 | A | | 11/1998 | Kajiwara ..................... 355/40 |
| 5,949,479 | A | | 9/1999 | Maruyama et al. .......... 348/97 |
| 6,049,375 | A | * | 4/2000 | Tazawa et al. |
| 6,064,468 | A | | 5/2000 | Sakaguchi .................... 355/67 |
| 6,332,598 | B1 | * | 12/2001 | Tsuji |

* cited by examiner

*Primary Examiner*—Russell Adams
*Assistant Examiner*—Khaled Brown
(74) *Attorney, Agent, or Firm*—Sughrue Mion, PLLC

(57) ABSTRACT

An image reading apparatus includes a diffusion box unit comprising a plurality of diffusion boxes, which each correspond to different sizes of photographic films, and controls the unit in such a manner that the diffusion box, which corresponds to the size of a film whose image is to be read, is positioned on an optical axis of a light source. Accordingly, the responsibility imposed upon an operator can be reduced and the error of choosing a wrong diffusion box can be prevented.

28 Claims, 25 Drawing Sheets

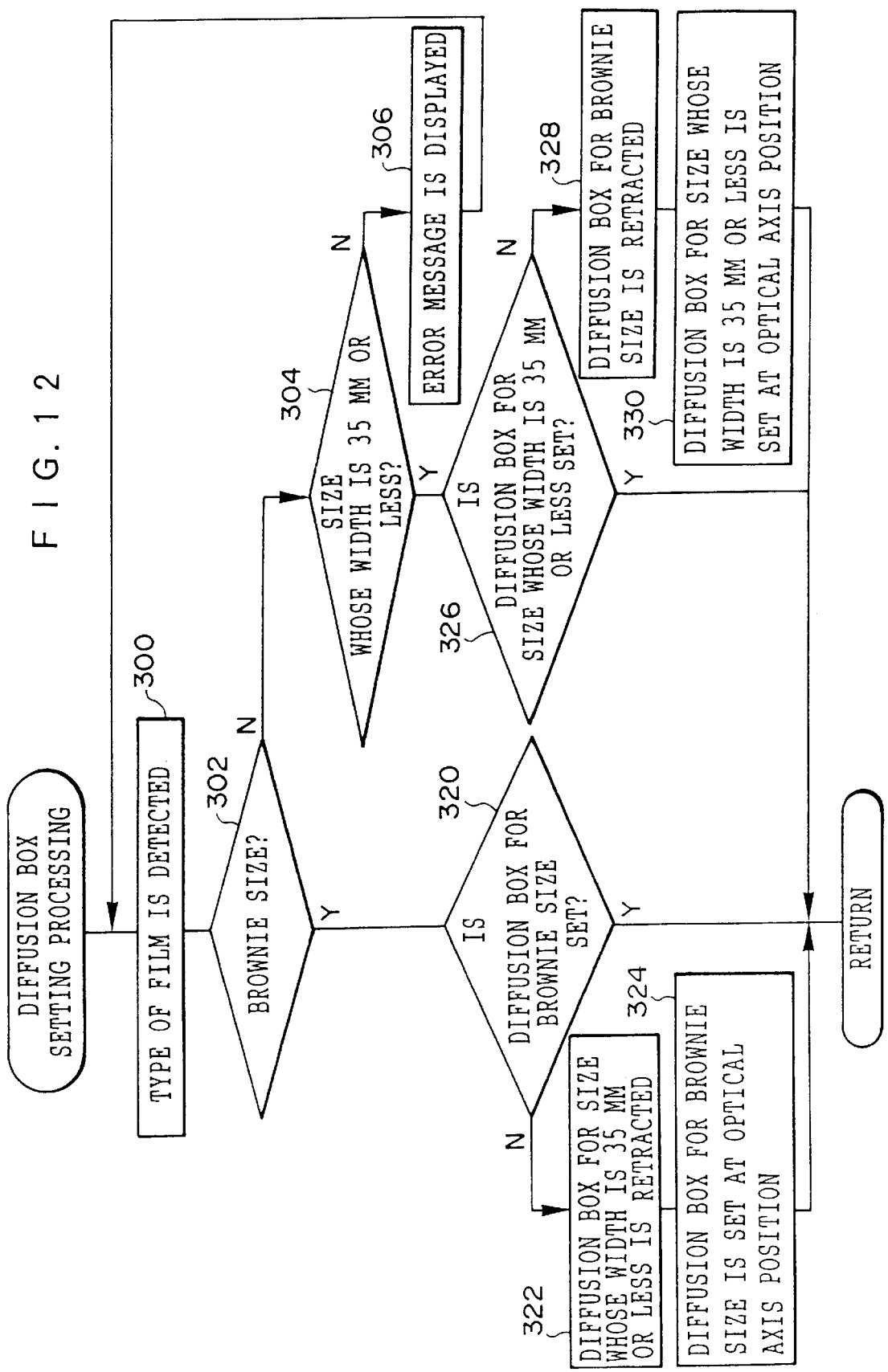
F I G. 12

F I G. 1 3 A
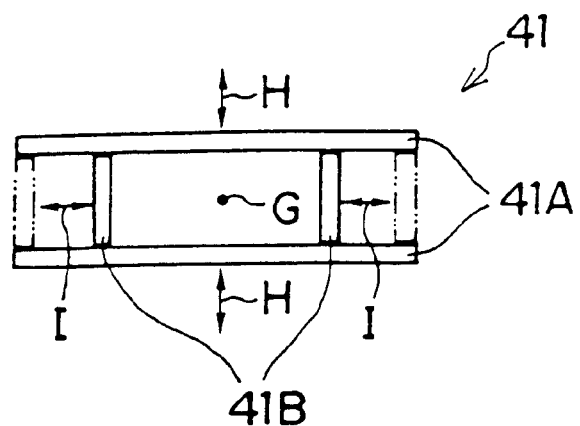
F I G. 1 3 B
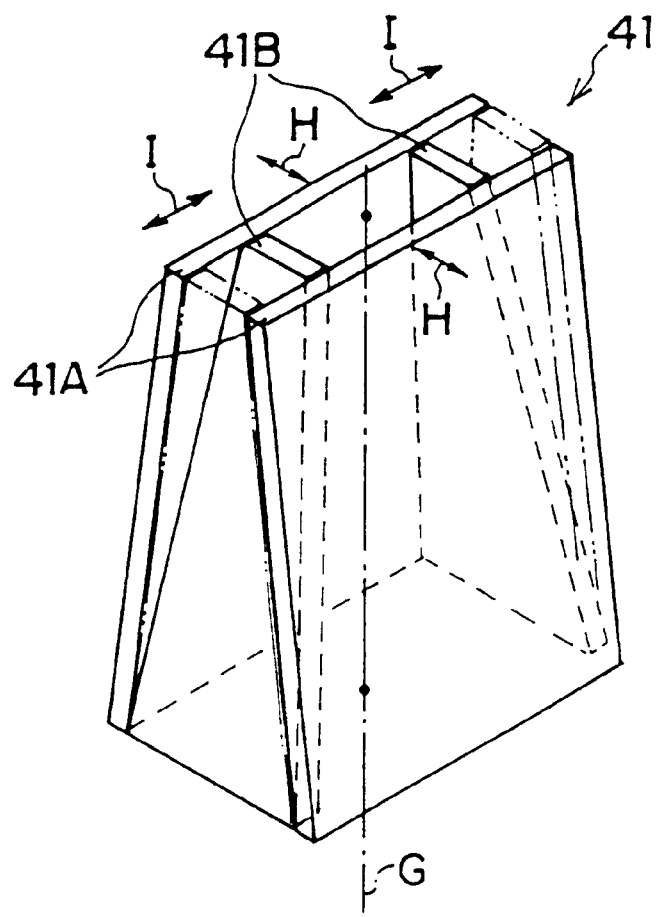

F I G. 1 4
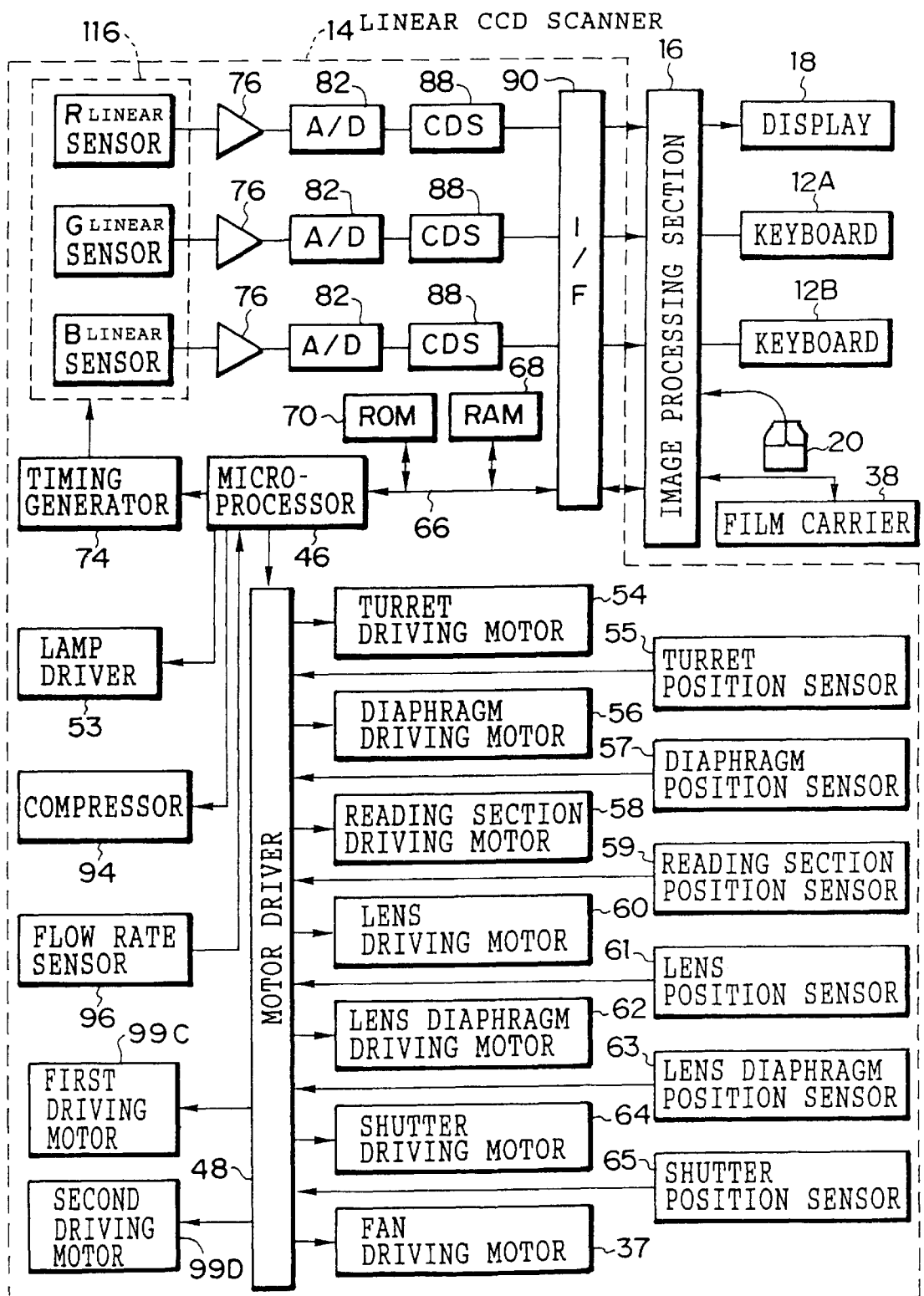

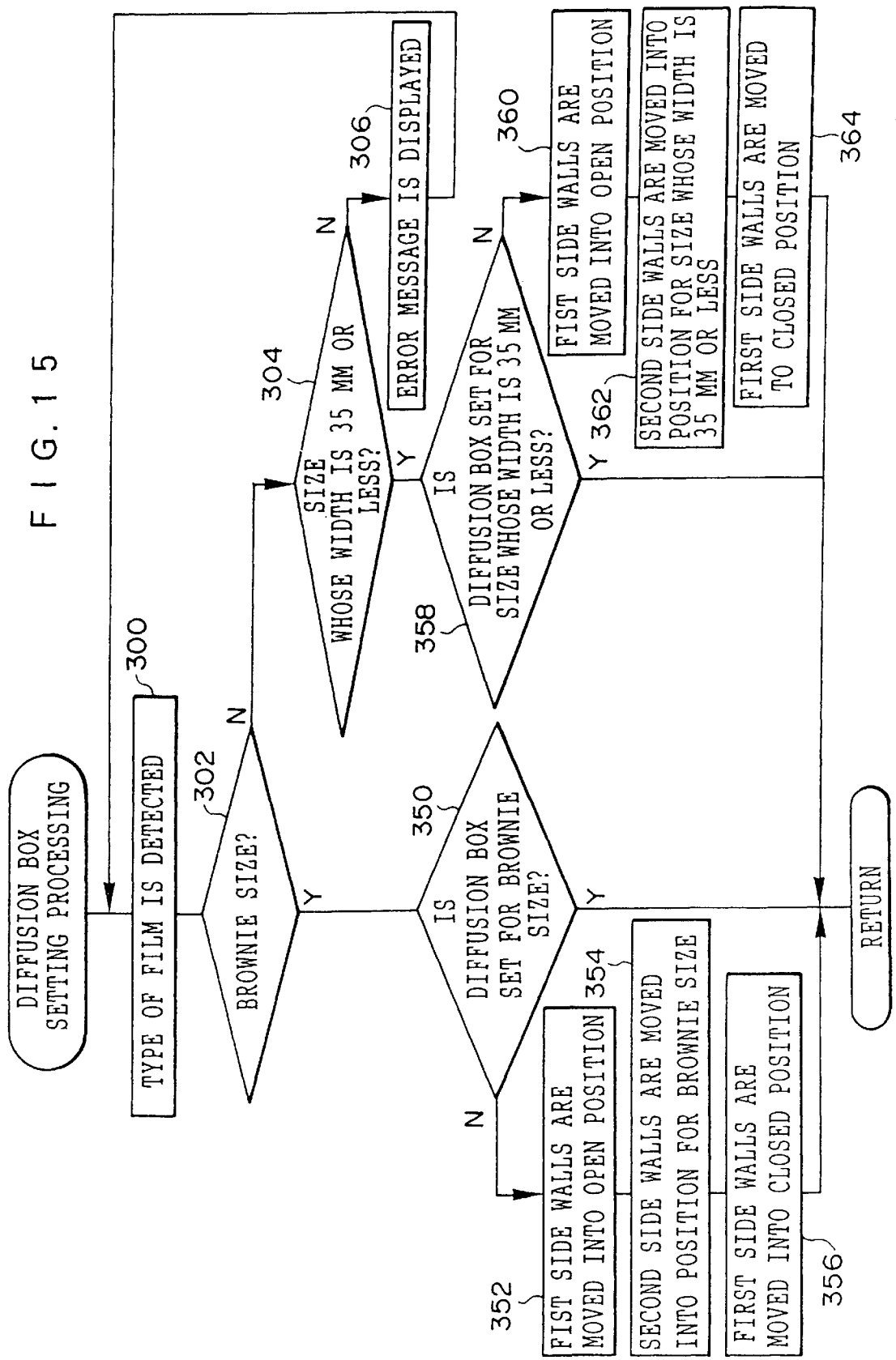

32B LIGHTENING AREA

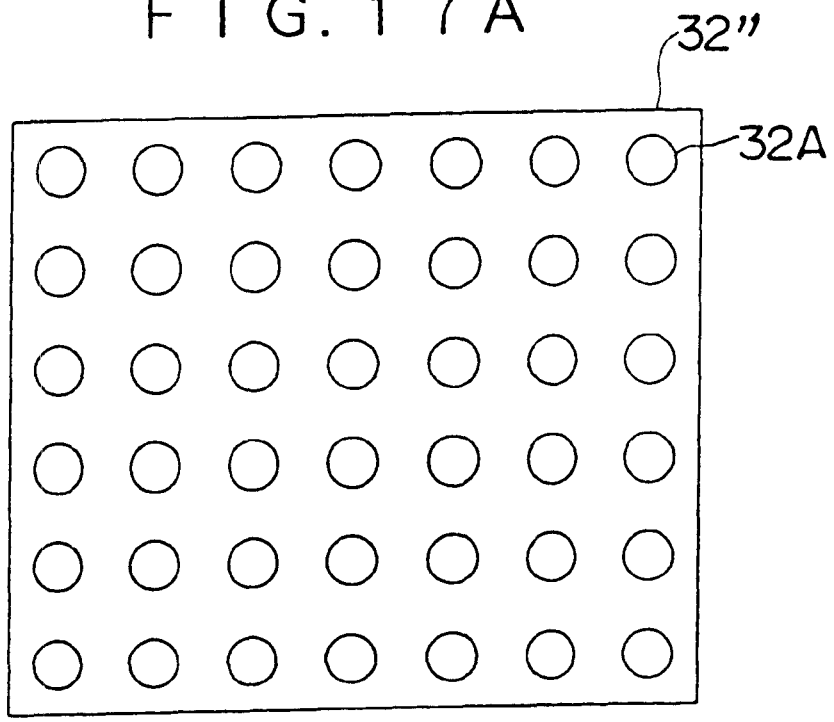
F I G. 1 7 A
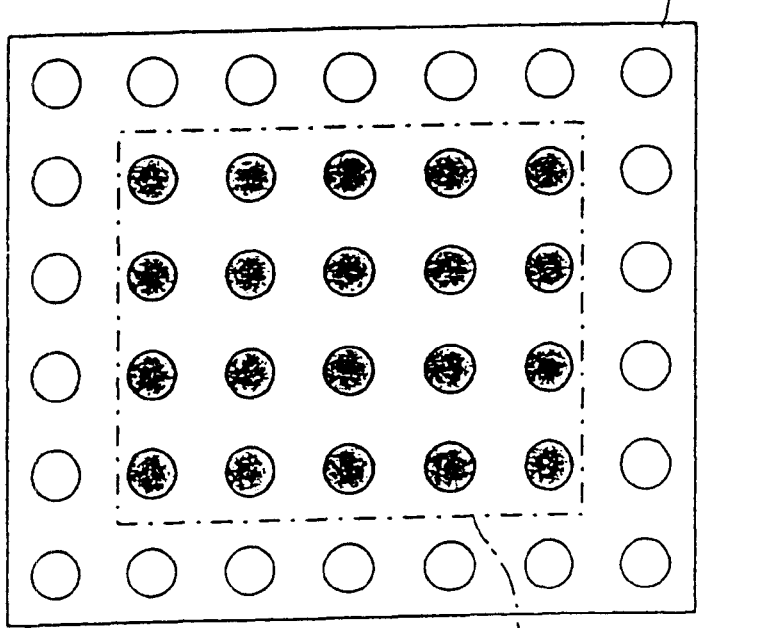
F I G. 1 7 B
32B' LIGHTENING AREA

566 LIGHT SOURCE

566 LIGHT SOURCE

IMAGE READING APPARATUS

This is a continuation of application Ser. No. 09/391,194 filed Sep. 7, 1999, the disclosure of which is incorporated herein by reference.

BACKGROUND OF THE INVENTION

1. Field of the Invention

The present invention relates to an image reading apparatus, and particularly to an image reading apparatus in which an image recorded on an original to be read such as a photographic film is read based on light transmitted through the image or light reflected from the image.

2. Description of the Related Art

There has been proposed in recent years a photographic processing method in which a film image recorded on a photosensitive material such as a photographic film (hereinafter referred to merely as photographic film) is read by an image sensor such as a CCD, based on light transmitted through the film image or light reflected from the film image when light is irradiated on the film image, and image data obtained by the reading is subjected to image processings including various corrections, and thereafter, the image is recorded on a recording material or is displayed on a display. It should be noted that the term photographic film used here refers to a film whose negative image or positive image is visualized by development processing, after a subject has been photographed.

In an image reading apparatus for use in reading a film image in this type of photographic processing method, a diffusion box is widely used in which illumination light emitted from a light source is made into diffused light, with the objects of making the amount of light, which is irradiated on the film image, substantially uniform, and making scratches, which are formed on the film surface when the image is recorded on a recording material, difficult to see. (See Japanese Patent Application Laid-Open (JP-A) Nos. 9-114008, 8-76271, etc.)

Conventionally, when a plurality of types of photographic film are to be read by the image reading apparatus as described above, such a diffusion box has been provided in advance for each type of photographic film, and an operator chooses the diffusion box according to the type of the photographic film to be read and disposes the chosen diffusion box at a predetermined position.

In other words, since the size of a film image recorded on a photographic film varies depending on the type of photographic film, there is a need to change an illumination range according to the type of the photographic film. Thus, there is a need to pick out and use the proper diffusion box from among several diffusion boxes according to the illumination range. In this case, a structure has also been conceived of in which a common diffusion box is used that can illuminate the entire surface of the largest film image of the film images recorded on the photographic films to be read by the image reading apparatus. However, it is desirable to irradiate an amount of light which is as large as possible on a photographic film by using a low amount of energy. Therefore, from this standpoint, it is preferable to employ a structure in which a proper diffusion box is picked out for use, from among several diffusion boxes, for each type of photographic film (for each size of photographic film).

However, in the above-described technique in which a proper diffusion box is picked out and used, from among several diffusion boxes, for each type of photographic film to be read, there is a problem in that, as the operator chooses the diffusion box according to type of the photographic film to be read and disposes it at a predetermined position, a large responsibility is imposed upon the operator and he/she may choose a wrong diffusion box.

SUMMARY OF THE INVENTION

The present invention has been attained to solve the above-described problems, and an object thereof is to provide an image reading apparatus in which the responsibility imposed upon an operator can be reduced and a wrong diffusion box can be prevented from being mischosen.

In order to achieve the above-described object, according to a first aspect of the present invention, there is provided an image reading apparatus comprising: illuminating means for illuminating an original to be read; changing means for changing automatically one of an illumination range and a degree of diffusion of the illuminating means according to reading conditions of the original to be read; a lens for focussing the original to be read; and an image sensor for separating the image of the original to be read, which is obtained through the lens, into a plurality of pixels for reading and outputting as image data.

In the image reading apparatus of the first aspect of the present invention, an original to be read is illuminated by the illuminating means. At this time, the changing means causes one of an illumination range and a degree of diffusion of the illuminating means to be changed automatically according to reading conditions of the original to be read. It should be noted that the above original to be read includes a transparent original such as a photographic film, a reflective original such as a photographic print, and the like.

Subsequently, an image of the original to be read, which is obtained through the lens for focusing the original to be read, is separated into a plurality of pixels and read by an image sensor, and is then outputted as image data. It should be noted that the above image sensor includes a linear CCD, an area CCD, and photoelectric transfer elements other than a CCD.

As described above, in the image reading apparatus of the first aspect of the present invention, since one of the illumination range and the degree of diffusion of the illuminating means are changed automatically according to the reading conditions of the original to be read, compared with the case in which the illumination range and degree of diffusion are changed by an operator, the responsibility imposed upon the operator can be reduced.

It should be noted that the above reading conditions of the first aspect include, as the second aspect, the following three types:

The size of the original to be read.

Whether the reading to be carried out is a preliminary reading or a main reading when the reading is carried out in two steps, i.e., the preliminary reading for reading an original to be read at relatively high speed but with low precision and the main reading for reading the original to be read at relatively low speed but with high precision based on image data obtained by the preliminary reading.

Whether the printing is a simultaneous film processing or a reprinting when the original to be read is a photosensitive material (photographic film).

In other words, generally, the larger the size of the original to be read is, the broader the area to be read becomes. Accordingly, as the size of the original to be read becomes larger, the range illuminated by the illuminating means is automatically broadened.

Further, when the original to be read is read in two steps, i.e., by the preliminary reading and the main reading, an area to be read sometimes needs to be broadened when the preliminary reading is carried out, compared with when the main reading is carried out. For example, if the original to be read is a photographic film, it is often necessary to detect the position of perforations as well as the contents of a bar code, which are provided outside the film image of the photographic film, when the preliminary reading is carried out. In such a case, the illumination range is automatically broadened when the preliminary reading is carried out, compared with when the main reading is carried out. As a result, an appropriate illumination range corresponding to the reading conditions (whether it is the preliminary reading or the main reading) can be automatically set.

Moreover, there are also occasions when scratches on the photographic film are present when the original to be read is a photographic film and reprints are made thereof. Therefore, the degree of diffusion of the illumination light is increased at the time of reprinting, compared with during simultaneous film processing, in order to reduce the scratches appearing on the print. Conversely, during simultaneous film processing, because there are hardly any scratches on the photographic film, the degree of diffusion is decreased thus allowing increased processing performance.

Likewise, examples of applicable methods, in which the illumination range and the degree of diffusion are changed automatically by the changing means in the first aspect, include a method in which the means for changing an area of an illumination light emitted from the illumination means is provided at an illumination light emitting side of the illuminating means so that the change is carried out by the means, as well as a method in which when the illuminating means is comprised of a plurality of light emitting portions disposed linearly or in the form of an array (in two dimensions), the illumination range is changed by turning on, among the above plurality of light emitting portions, only the ones that correspond to the area to be illuminated.

When the original to be read is, for example, a photographic film, as mentioned above, the size of the film image recorded on the photographic film differs depending on the type of photographic film. Accordingly, there is a need to change the illumination range and the degree of diffusion according to the type of photographic film.

Thus, according to a third aspect of the present invention, there is provided an image reading apparatus according to the first or second aspect, wherein the changing means is comprised of: a plurality of light diffusing means, each of which having one of a different illumination range and a degree of diffusion, in which illumination light generated by the illuminating means is made into diffused light; and controlling means for changing one of the illumination range and the degree of diffusion automatically by effecting control such that the light diffusing means corresponding to the type of the original to be read is chosen from among the plurality of light diffusing means and the chosen light diffusing means is located on one of an optical axis and an optical path.

In the image reading apparatus of the third aspect of the present invention, one of the illumination range and the degree of diffusion is changed automatically when the controlling means effects control such that light diffusing means corresponding to the type of an original to be read is chosen, from among a plurality of light diffusing means in which illumination light generated by the illuminating means is made into diffused light and each of which has one of a different illumination range and degree of diffusion, and the chosen light diffusing means is located on one of an optical axis and an optical path. It should be noted that the above-described diffusion box corresponds to the light diffusing means of the present invention.

As described above, in the image reading apparatus of the third aspect of the present invention, one of the illumination range and the degree of diffusion is changed automatically by choosing the light diffusing means in accordance with the type of the original to be read from among the plurality of light diffusing means, in which the illumination light generated by the illuminating means is made into diffused light and each of which has one of a different illumination range and degree of diffusion, and by locating the chosen light diffusing means on one of the optical axis and the optical path. Accordingly, the responsibility imposed upon an operator can be reduced and errors in setting the light diffusing means (such as a mischoice of the light diffusing means, an error in the setting procedure of the light diffusing means, and the like) can be prevented, compared with the case in which light diffusing means has been provided for each type of original to be read and the operator chooses and sets the light diffusing means according to the type of the original to be read.

According to a fourth aspect of the present invention, there is provided an image reading apparatus according to the third aspect, further comprising a plurality of conveying means, each of which is provided for each type of original to be read, for conveying the original to be read in such a manner that the original to be read passes a position at which the image sensor carries out a reading, wherein the controlling means chooses the light diffusing means in accordance with the type of the original to be read by detecting the type of the original to be read or the type of the conveying means.

As described above, when the image reading apparatus of the third aspect of the present invention includes the plurality of conveying means, each of which is provided for each type of original to be read, for conveying the original to be read in such a manner that the original to be read passes a position in which the image sensor carries out a reading, the type of the original to be read, which has been described above, can be specified not only by detecting directly the type of the original to be read but also by detecting the type of the conveying means.

In a fifth aspect of the present invention, in the image reading apparatus according to the third or fourth aspect, the controlling means can cause the chosen light diffusing means to move, thereby allowing it to be located on one of the optical axis and the optical path. The movement here includes a movement in which the plurality of light diffusing means are integrated into a single structure or unit and the chosen light diffusing means is located on one of the optical axis and optical path by moving the integrated structure, and a movement in which the chosen light diffusing means is located on one of the optical axis and optical path by moving the chosen light diffusing means individually.

According to a sixth aspect of the present invention, there is provided an image reading apparatus according to the first or second aspect, wherein the changing means is comprised of: a light diffusing means whose outer periphery is structured in the form of a hollow cylinder with four side walls comprising a pair of first side walls and a pair of second side walls whose respective upper end portions are movable toward and apart from each other, and which makes illumination light generated by the illuminating means into diffused light; and controlling means for changing the illumination range automatically by effecting control so that the respective upper end portions of the second side walls are moved according to the type of the original to be read.

In the image reading apparatus of the sixth aspect of the present invention, the outer periphery of the light diffusing means is structured in the form of a hollow cylinder with four side walls comprising a pair of first side walls and a pair of second side walls whose upper end portions are movable toward and apart from each other, and the illumination range is changed automatically by moving upper end portions of the second side walls of the light diffusing means, in which illumination light generated by the illuminating means is made into diffused light, according to the type of original to be read.

As described above, in the image reading apparatus of the sixth aspect of the present invention, the outer periphery of the light diffusing means is structured in the form of a hollow cylinder with four side walls comprising a pair of first side walls and a pair of second side walls whose upper end portions are movable toward and apart from each other, and the illumination range is changed automatically by moving upper end portions of the second side walls of the light diffusing means, in which illumination light generated by the illuminating means is made into diffused light, according to the type of original to be read. Accordingly, it is made possible to accommodate a plurality of types of originals to be read with one light diffusing means. Also, as compared with the case in which light diffusing means is provided for each type of original to be read, the region for installing the light diffusing means can be made smaller, which allows miniaturization of the apparatus as well as a reduction in the cost of the apparatus.

According to a seventh aspect of the present invention, there is provided an image reading apparatus according to the sixth aspect, wherein the pair of first side walls is structured in such a manner that the respective upper end portions thereof are able to move toward and apart from each other, and the controlling means effects control so that the respective upper end portions of the pair of first side walls are moved in the direction in which they move apart from each other before the second side walls are moved, and the respective upper end portions of the pair of first side walls are moved in the direction in which they move toward each other after the second side walls has been moved.

In the image reading apparatus of the seventh aspect of the present invention, in the image reading apparatus of the sixth aspect, the pair of first side walls are structured in such a manner that the respective upper end portions thereof are able to move toward and apart from each other, and further the controlling means causes the respective upper end portions of the pair of first side walls to move in the direction in which they move apart from each other before the second side walls are moved, and the respective upper end portions of the pair of first side walls to move in the direction in which they move toward each other after the second side walls has been moved.

As described above, in the image reading apparatus of the seventh aspect of the present invention, an effect similar to that of the invention of the sixth aspect can be realized. In addition, since the respective upper end portions of the pair of first side walls are moved in the, direction in which they move apart from each other before the second side walls are moved, and the respective upper end portions of the pair of first side walls are moved in the direction in which they move toward each other after the second side walls has been moved, the second side walls do not come into contact with the first side walls when the second side walls are moved. Accordingly, the second side walls can be moved by using a low amount of energy and damage caused by the friction of the respective side walls can be prevented.

It should be noted in the image reading apparatus of the sixth and seventh embodiments, movement of the pair of second side walls is preferably carried out in a continuous manner or a stepping manner. When the second side walls are moved in the continuous manner, the upper end portions thereof can be set at any position insofar as it is within a region allowed for movement. Thus, the structure can be used for a larger number of types of originals to be read, compared with the case in which the second side walls are moved in the stepping manner. When the pair of second side walls is moved in the stepping manner, compared with the case in which they are moved in the continuous manner, more accurate positioning thereof can be conducted in a shorter time.

According to an eighth aspect of the present invention, there is provided an image reading apparatus for irradiating light outputted from a light source onto an original so as to read light transmitted through the original or light reflected by the original by a photoelectric transfer element, comprising: a plurality of diffusion boxes for converting the light outputted from the light source into diffused light so as to irradiate the diffused light onto an area of the original to be read; and moving means for selectively moving the plurality of diffusion boxes on an optical path of the light outputted from the light source.

In the image reading apparatus of the eighth aspect of the present invention, the plurality of diffusion boxes convert the light outputted from the light source into diffused light. For example, a plurality of diffusion boxes that have different light irradiation areas can be used so as to irradiate the light from the light source onto the originals of different original sizes. Further, the moving means selectively moves the plurality of diffusion boxes on the optical path of the light outputted from the light source. In other words, diffused light can be irradiated onto the light irradiation area in accordance with the reading conditions such as the size of the original and the like. Accordingly, although the necessity for an operator to change the diffusion boxes according to the reading conditions such as the size of the original and the like is obviated, efficient reading of the image can be carried out.

According to a ninth aspect of the present invention, there is provided an image reading apparatus for irradiating light outputted from a light source onto an original so as to read light transmitted through the original or light reflected by the original by a photoelectric transfer element, comprising: a first diffusion box for converting the light outputted from the light source into diffused light so as to irradiate the diffused light onto an area of the original to be read; and a second diffusion box for converting the light outputted from the light source into diffused light so as to irradiate the diffused light onto the original to be read, which is disposed in such a manner as to be movable with the light source inside the first diffusion box along the optical axis of the light outputted from the light source.

In the image reading apparatus of the ninth aspect of the present invention, the first diffusion box, for example, makes the light from the light source into diffused light such that the light is irradiated on the original of the largest size of all the originals to be read. Then, the second diffusion box is provided in the interior of the first diffusion box and is disposed in such a manner as to be movable with the light source along the optical axis of the light outputted from the light source. In other words, by moving the positions of the light source and the second diffusion box along the optical axis of the light outputted from the light source, originals of different sizes, i.e., originals from the smallest to the largest sizes of all the originals to be read, can be read. Moreover, as the light source is moved with the second diffusion box, efficient use of the light outputted from the light source can be achieved.

Accordingly, although the necessity for an operator to change the diffusion boxes according to the reading conditions such as the size of the original and the like is obviated, efficient reading of the image can be carried out.

For example, when a 220 size (Brownie size) photographic film and a 135 size photographic film are read as originals, the range onto which the diffusion light according to the size of the photographic film (the size of the original) is irradiated is adjusted in the following manner: the second diffusion box is moved in the direction in which it moves away from the photographic film so that the Brownie size photographic film can be read by the first diffusion box, and for the reading of the 135 size photographic film, the second diffusion box is moved in the direction in which it moves toward the photographic film so that the 135 size photographic film is read by the second diffusion box.

An LED element can be used as the light source.

BRIEF DESCRIPTION OF THE DRAWINGS

FIG. 5A and 5B are perspective views respectively showing two diffusion boxes mounted on a plate member in the shape of a rectangle when seen as a plan view, and two diffusion boxes mounted on a plate member in the shape of an arc when seen as a plan view.

FIG. 12 is a flowchart which shows diffusion box setting processing executed in the second embodiment during execution of the image reading processing of FIG. 8.

FIGS. 13A and 13B each show a schematic diagram which shows a structure of a diffusion box in an image reading apparatus according to a third embodiment: FIG. 13A is a top plan view; and FIG. 13B is a perspective view.

FIG. 14 is a block diagram which schematically shows a structure of an electric system of a linear CCD scanner and an image processing section of the image reading apparatus according to the third embodiment of the present invention.

FIG. 15 is a flowchart which shows diffusion box setting processing executed in the third embodiment during execution of the image reading processing of FIG. 8.

FIG. 16A is a plan view showing an example of the illuminating means in the case when an image sensor of the present invention is a linear CCD; FIG. 16B is a plan view showing an example of a changed condition of the range illuminated by the illuminating means of FIG. 16A.

FIGS. 17A and 17B each show an explanatory drawing which illustrates a fifth embodiment of the present invention: FIG. 17A is a plan view showing an example of the illuminating means in the case when the image sensor of the present invention is an area CCD; FIG. 17B is a plan view showing an example of a changed condition of the range illuminated by the illuminating means of FIG. 17A.

DESCRIPTION OF THE PREFERRED EMBODIMENTS

Figure 1:
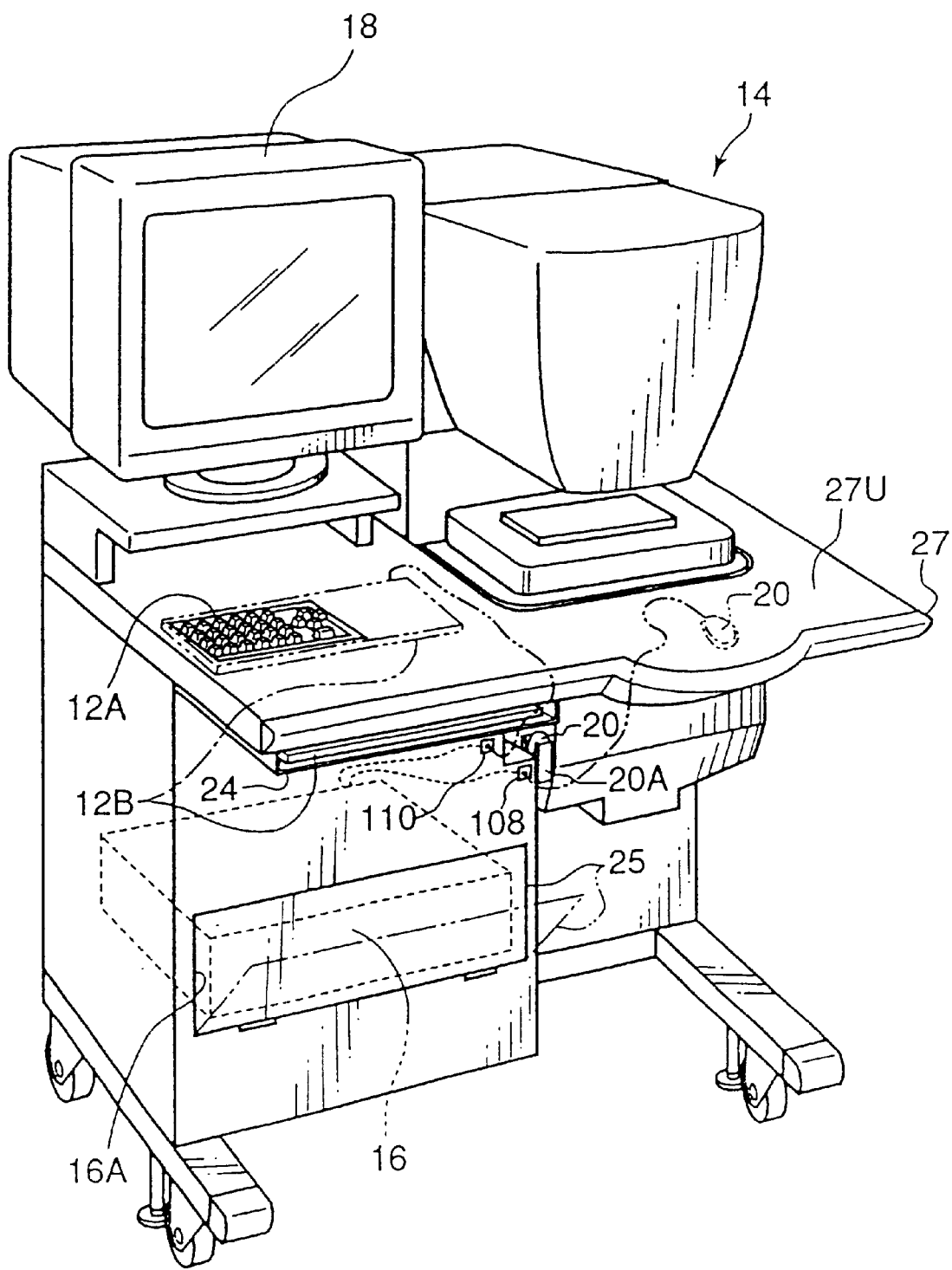
FIG. 1 is an outside view of an image reading apparatus according to an embodiment of the present invention.

Referring now to the drawings, an embodiment of the present invention will be hereinafter described in detail.
First Embodiment As shown in FIG. 1, an image reading apparatus according to a first embodiment of the present invention includes a linear CCD scanner 14. The linear CCD scanner 14 is placed on a work table 27 with an image processing section 16, a mouse 20, two types of keyboards 12A and 12B, and a display 18 being provided thereon.

One of the keyboards, the keyboard 12A, is embedded in a work surface 27U of the work table 27. Another keyboard 12B is accommodated in a drawer 24 of the work table 27 when not in use. When using the keyboard 12B, it is taken out of the drawer 24 and placed over the keyboard 12A. At this time, a cord of the keyboard 12B is connected to a jack 110 connected to the image processing section 16.

A cord of the mouse 20 is connected to the image processing section 16 via a through hole 108 formed in the work table 27. The mouse 20 is accommodated in a mouse holder 20A when not in use. When using the mouse 20, it is taken out of the mouse holder 20A and placed on the work surface 27U.

The image processing section 16 is accommodated in an accommodating portion 16A provided in the work table 27 and is closed by a hatch 25. The image processing section 16 can be taken out after opening the hatch 25.

The linear CCD scanner 14 is,used to read film images recorded on a photographic film such as a negative film or a reversal film (positive film). Examples of the photographic film on which a film image to be read is recorded include a 135 size photographic film, a 110 size photographic film, a photographic film with a transparent magnetic layer formed thereon (i.e., a 240 size photographic film: a so-called APS film), and 120 size and 220 size photographic films (hereinafter, referred to as a Brownie size). The linear CCD scanner 14 reads the above-described film images to be read by a linear CCD and outputs image data.

It should be noted that the above photographic films to be read can be classified broadly into two groups: photographic films whose size in the transverse direction is 35 mm or less, such as a 135 size photographic film, a 110 size photographic film and a 240 size photographic film, and photographic films whose size in the transverse direction is approximately 60 mm, such as a 120 size photographic film and 220 size photographic film.

Image data outputted from the linear CCD scanner 14 is inputted into the image processing section 16, where image processings including various corrections and the like are effected to the inputted image data and then the processed image data is outputted, as image data for recording, to a laser printer section (not shown).

Figure 2:
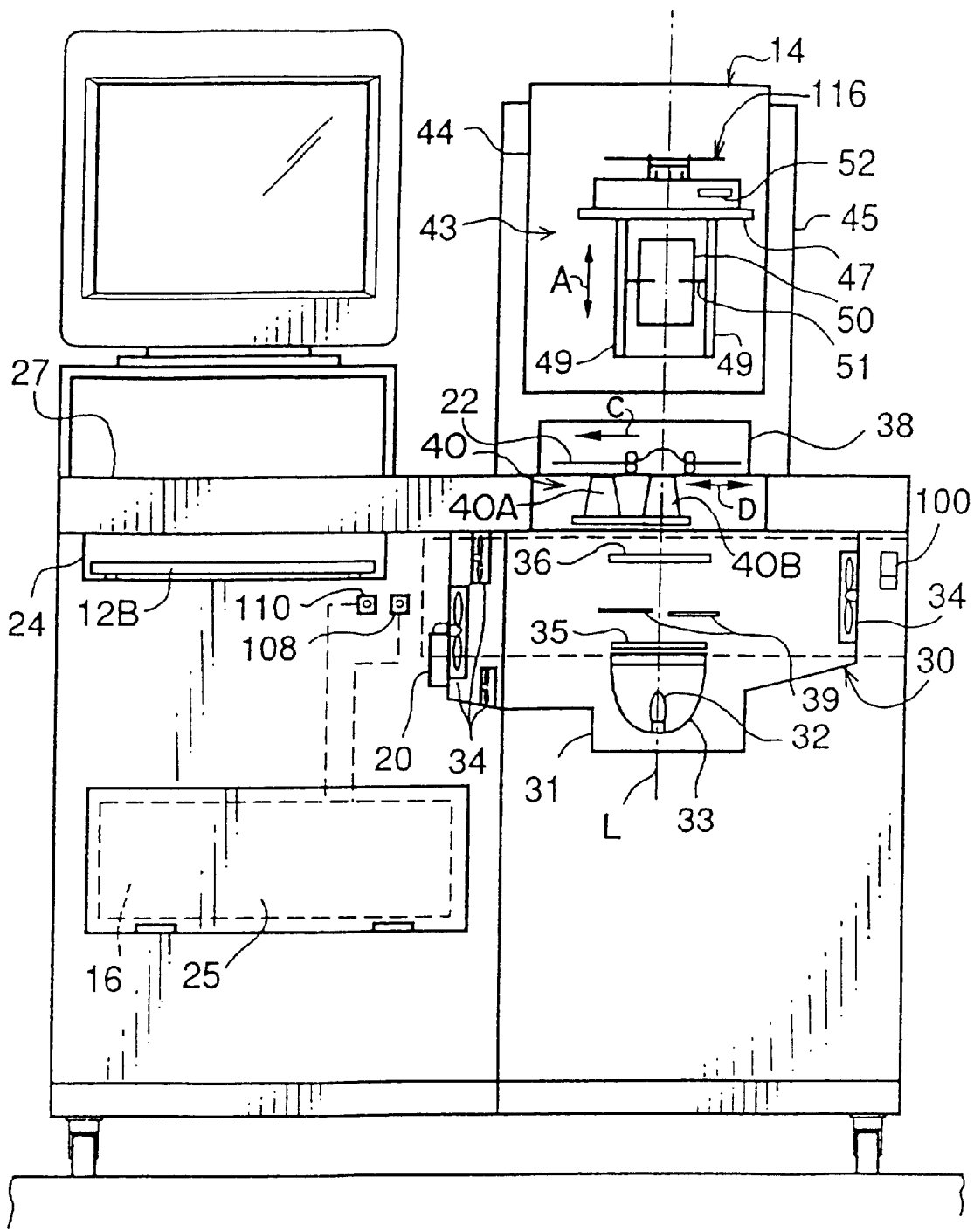
FIG. 2 is a cross-sectional view of an optical system of the image reading apparatus according to the embodiment of the present invention as seen from the front of the apparatus.
Figure 3:
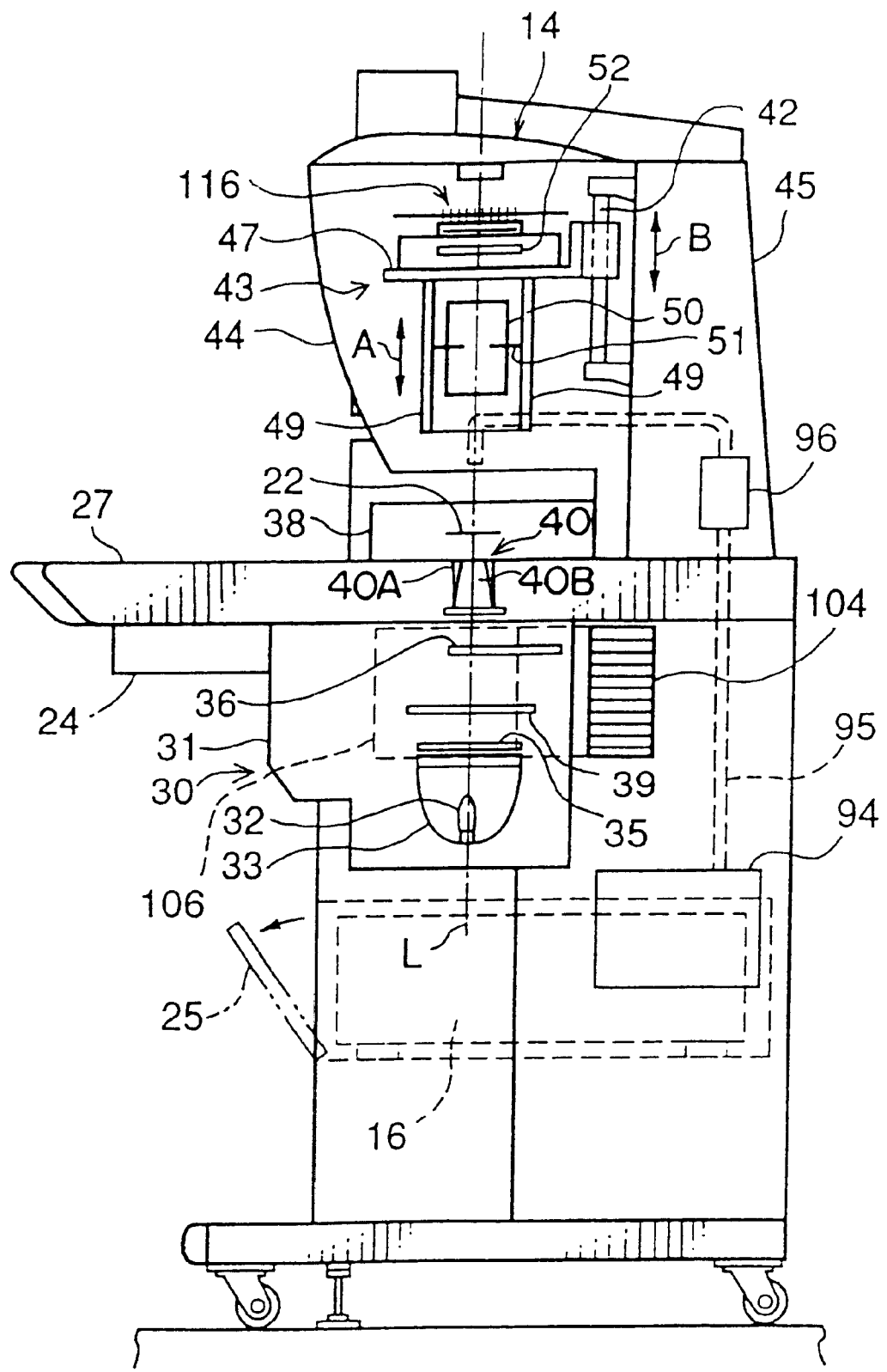
FIG. 3 is a cross-sectional view of the optical system of the image reading apparatus according to the embodiment of the present invention as seen from a side of the apparatus.

As shown in FIGS. 2 and 3, an optical system of the linear CCD scanner 14 includes a light source portion 30, a diffusion box unit 40, a film carrier 38, and a reading section 43. The light source portion 30 is disposed below the work table 27 and the diffusion box unit 40 is disposed in the vicinity of a position at which light from the light source portion 30 is emitted. The film carrier 38 is set on the work table 27 and the reading section 43 is disposed at the side of the work table 27 opposite to the side at which the light source portion 30 is disposed.

The light source portion 30 is accommodated in a casing 31 made of metal. A lamp 32 comprised of a halogen lamp, a metal halide lamp, or the like is disposed within the casing 31. It should be noted that the lamp 32 is held in an X-Y stage (not shown) which is formed in such a manner as to be able to move in the following two directions; in the longitudinal direction (conveying direction) of the photographic film 22 and in the transverse direction of the photographic film 22. Fine adjustment of the position of the lamp 32 can be carried out by moving the position of the X-Y stage.

A reflector 33 is provided at a periphery of the lamp 32, and a portion of the light emitted from the lamp 32 is reflected by the reflector 33 so as to be reflected off in a fixed direction.

A plurality of fans 34 are provided at the sides of the reflector 33. The fans 34 are operated when the lamp 32 is lit so as to prevent an interior of the casing 31 from being overheated.

A UV/IR cutting filter 35, a diaphragm 39, and a turret 36 are disposed in that order at a light emission side of the reflector 33 along an optical axis L of the light emitted from the reflector 33. The UV/IR cutting filter 35 cuts light having wavelengths in the ultraviolet and infrared regions so as to prevent chemical changes occurring in the photographic film 22 as well as a rise in the temperature of the photographic film 22, thereby improving reading accuracy. The diaphragm 39 is provided to adjust the amount of light from the lamp 32 and the amount of light emitted from the reflector 33. The turret 36 includes a negative film balance filter 36N and a reversal film balance filter 36P (see FIG. 4B also), which are embedded in the turret 36 so as to allow proper setting of color components of light which reaches the photographic film 22 and the reading section 43 in accordance with the type of the photographic film (a negative film or a reversal film).

Figure 4A:
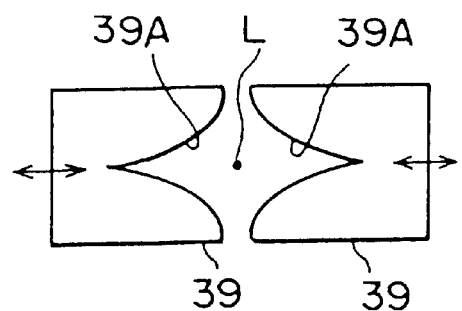
FIGS. 4A, 4B, 4C and 4D are plan views respectively showing examples of a diaphragm, a turret, a lens diaphragm, and a CCD shutter.

The diaphragm 39 comprises a pair of plate members that are disposed with the optical axis L interposed therebetween. The pair of plate members are allowed to move in a sliding manner so as to move toward and apart from each other. As shown in FIG. 4A, each plate member of the pair of plate members of the diaphragm 39 includes a notch 39A at one end thereof so that a cross-sectional area of each plate member along a direction perpendicular to the direction of sliding changes continuously from the one end toward the other end of the plate member along the direction of sliding. The plate members are disposed in such a manner that the sides of the plate members, in which the notches 39A are formed, face each other.

In the above structure, one of the filters (36N and 36P) in accordance with the type of the photographic film is located on the optical axis L so that light of the desired light components is obtained, and the amount of light passing through the diaphragm 39 is adjusted by the position of the diaphragm 39 so that a desired amount of light is produced.

Figure 5A:
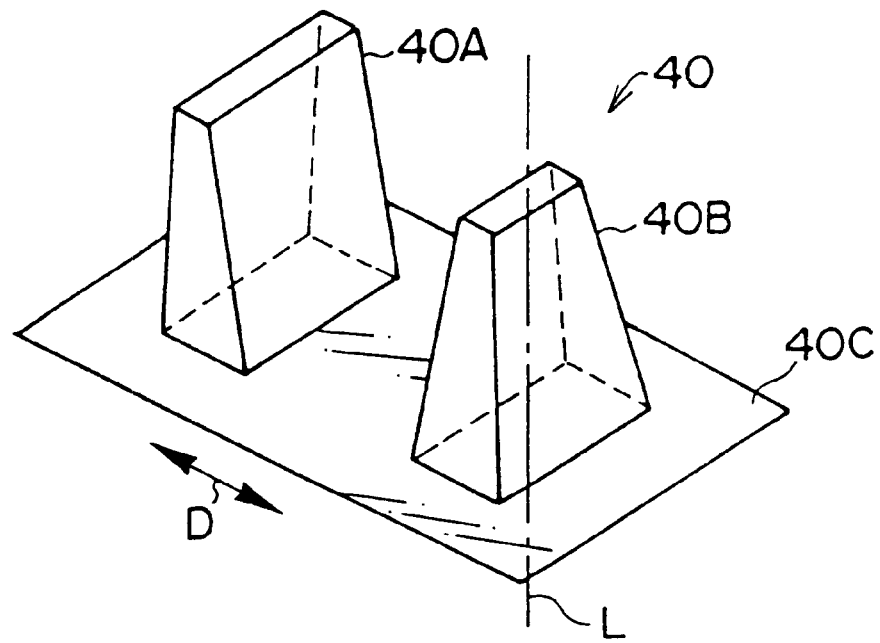
FIGS. 5A and 5B each show a schematic diagram which shows a structure of a diffusion box unit in an image reading apparatus according to a first embodiment.

As shown in the FIG. 5A, the diffusion box unit 40 is structured by mounting a diffusion box 40A and a diffusion box 40B, both having a hollow trapezoidal shape, with a predetermined space therebetween on a plate member 40C, which is in the shape of a rectangle when seen in a plan view. The diffusion boxes 40A and 40B are each formed in such a manner that, toward a top portion thereof (that is, in a direction nearing the photographic film 22), the width is reduced along the direction in which the photographic film 22 is conveyed by the film carrier 38. At this point, the plate member 40C includes openings that correspond to the lower end portions (at a light entering side) of the respective diffusion boxes, and the respective diffusion boxes are mounted on the plate member 40C in such a manner that the lower end portions of the respective diffusion boxes correspond to the openings.

The diffusion box 40A is used to read a film image recorded on a photographic film of a Brownie size (such as a 120 size photographic film and a 220 size photographic film). The diffusion box 40B is used to read a film image recorded on a photographic film whose width is 35 mm or less (such as a 135 size photographic film, a 110 size photographic film and a 240 size photographic film). Accordingly, the width of the opening of the upper end portion (at a light exiting side) of the diffusion box 40A is larger than that of the diffusion box 40B.

Further, light diffusion plates are mounted at the respective ones of the lower end portion (light entering side) and the upper end portion (light exiting side) of the diffusion box units 40A and 40B.

The plate member 40C of the diffusion box unit 40 is located in the work table 27 in such a manner that it is movable in a sliding manner by a diffusion box driving motor (described later) in the directions indicated by double-headed arrow D in FIG. 2 (FIG. 5A). The plate member 40C can be set at a position at which a center of one of the diffusion box 40A and the diffusion box 40B substantially coincides with the optical axis L.

Light entering into the diffusion box, which is disposed on the optical axis L, is directed toward the film carrier 38 (that is, to the photographic film 22) and is made into slit light whose longitudinal direction coincides with a transverse direction of the photographic film 22. Then, the light is made into diffused light by the light diffusion plates and emitted from the diffusion box. Since the light emitted from the diffusion box 40A or 40B is made into diffused light as described above, unevenness of the amount of the light irradiated onto the photographic film 22 is reduced so that a uniform amount of the slit light is irradiated onto the film image. For the same reason, even if the film image is scratched, these scratches become difficult to notice.

The film carrier 38 is provided for each type of photographic film 22 to be read, and is selected according to the type of the photographic film 22 so as to be set in the work table 27. The film carrier 38 includes a plurality of microswitches (not shown) so that the type of the film carrier that is set can be specified by a combination of on and/or off states of the microswitches.

Elongated openings (not shown) whose longitudinal dimension is larger than the transverse dimension of the photographic film 22 in the transverse direction thereof are provided in upper and lower surfaces of the film carrier 38 at positions intersecting the optical axis L. The slit light from the diffusion box 40A or 40B is irradiated onto the photographic film 22 through the opening provided on the lower surface of the film carrier 38, and the light transmitted through the photographic film 22 reaches the reading section 43 through the opening provided on the upper surface of the film carrier 38.

It should be noted that the image reading apparatus according to the present embodiment conducts preliminary reading for reading a film image at relatively high speed but with low precision (hereinafter, referred to as "pre-scanning") through the use of the film carrier 38 when conducting a reading of a film image. Then, based on image data obtained by the pre-scanning, the following two conditions are determined: a reading condition for the time when main reading for reading the film image at relatively low speed but with high precision (hereinafter, referred to as "fine scanning") is conducted; and a processing condition of various image processings performed on image data obtained by the fine scanning. Subsequently, the image reading apparatus not only conducts the fine scanning under the determined reading conditions, but also effects image processings to the image data obtained by the fine scanning under the processing conditions determined in the above manner.

Thus, the film carrier is structured so as to be able to convey the photographic film 22 at different speeds in correspondence to the density and the like of a film image that is to be fine scanned, during pre-scanning or fine scanning.

The reading section 43 is disposed in a state in which it is accommodated within the casing 44. Within the casing 44, a mounting stand 47 with a linear CCD 116 being provided on the upper surface thereof is disposed and a lens sleeve 49 extends downward from the mounting stand 47. A lens unit 50 is supported within the lens sleeve 49 in such a manner as to be able to move slidingly in the directions indicated by double-headed arrow A in which it moves toward and apart from the work table 27, in order to alter the magnification for example, for reduction or enlargement.

A support frame 45 is provided upright on the work table 27. The mounting stand 47 is supported by a guide rail 42 mounted on the support frame 45 in such a manner as to be movable in a sliding manner in the directions indicated by double-headed arrow B in which it moves toward and apart from the work table 27, in order to ensure a conjugate length during the above-described alteration of magnification, or during focusing control.

The lens unit 50 comprises a plurality of lenses and a lens diaphragm 51 is provided among the plurality of lenses. As shown in FIG. 4C, the lens diaphragm 51 includes a plurality of diaphragm plates 51A which are each formed so as to have a substantially C-shaped configuration. Each of the diaphragm plates 51A is arranged uniformly around the optical axis L. One end portion of each diaphragm plate 51A is supported by a pin so that the diaphragm plate 51A is allowed to rotate on the pin. The plurality of diaphragm plates 51A are joined together via a link (not shown), so that when a driving force is transmitted from a lens diaphragm driving motor (described later) to the lens diaphragm 51, these diaphragm plates 51A rotate together in the same direction. Together with the rotation of the diaphragm plates 51A, the surface area of the region which is not cut off from light by the diaphragm plates 51A (that is, the substantially star-shaped portion shown in FIG. 4C) changes around the optical axis L which serves as a center, and the amount of light passing through the lens diaphragm 51 thereby changes.

In the linear CCD 116, three sensing portions each including a large number of photoelectric transfer elements such as CCD cells or photodiodes, which are arranged in a row in the transverse direction of the photographic film 22, and further including an electronic shutter mechanism, are provided in parallel at intervals, and color separation filters of R, G, and B are respectively mounted at light incident sides of the three sensing portions (a so-called three-line primary color CCD structure). A large number of transmitting portions are provided in the vicinity of each of the sensing portions so as to correspond to the sensing portion. An electric charge accumulated in each CCD cell in the respective sensing portions is transmitted sequentially via the transmitting portion corresponding to the sensing portion.

Further, a CCD shutter 52 is provided at the side of the linear CCD 116 where light is made incident. As shown in FIG. 4D, an ND filter 52ND is fitted in the CCD shutter 52. The CCD shutter 52 rotates in the direction indicated by arrow u so as to be changed into any one of the following states: a completely closed state which blocks light that would otherwise be incident on the linear CCD 116 and which is for darkness correction and protection of the color separation filters provided in the linear CCD 116 (a portion 52B or the like, which does not have an ND filter 52ND embedded therein, is located at a position 52C that includes the optical axis L); a completely open state which allows light to be incident on the linear CCD 116 and which is for normal reading or light correction (the position shown in FIG. 4D); and a reduced light state, in which light made incident on the linear CCD 116 is reduced by the ND filter 52ND and which is for linearity correction (that is, a state in which the ND filter 52ND is located at the position 52C).

As shown in FIG. 3, the work table 27 is provided with a compressor 94 that generates cooling air for cooling the photographic film 22. The cooling air generated by the compressor 94 is fed by a guide pipe 95 and supplied to a reading section (not shown) of the film carrier 38. As a result, a region located at the reading section of the photographic film 22 can be cooled. It should be noted that the guide pipe 95 passes through a flow sensor 96 for detecting the flow rate of the cooling air.

Figure 6:
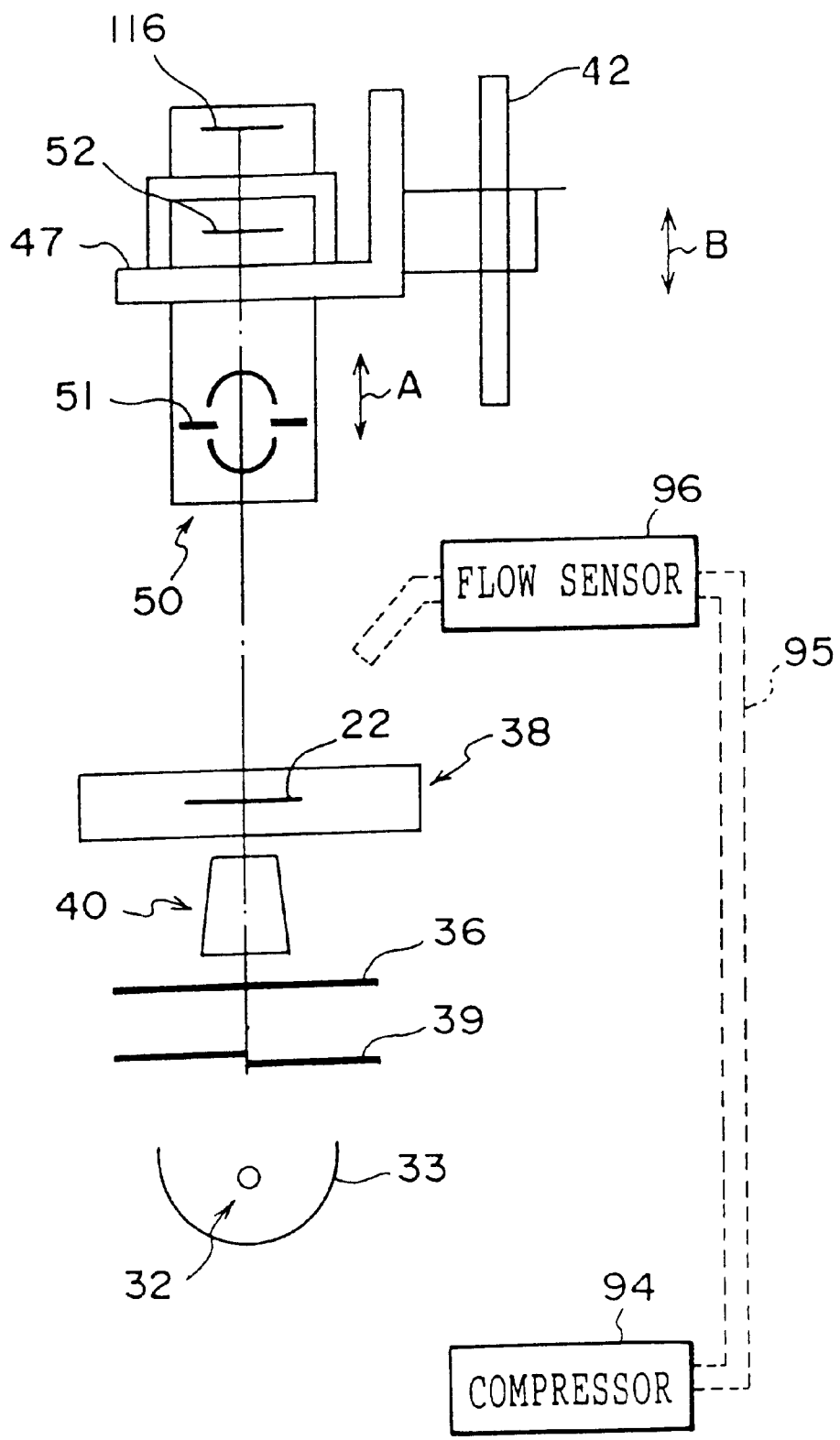
FIG. 6 is a schematic diagram which only shows principal portions of the optical system of the image reading apparatus according to the embodiment of the present invention.
Figure 7:
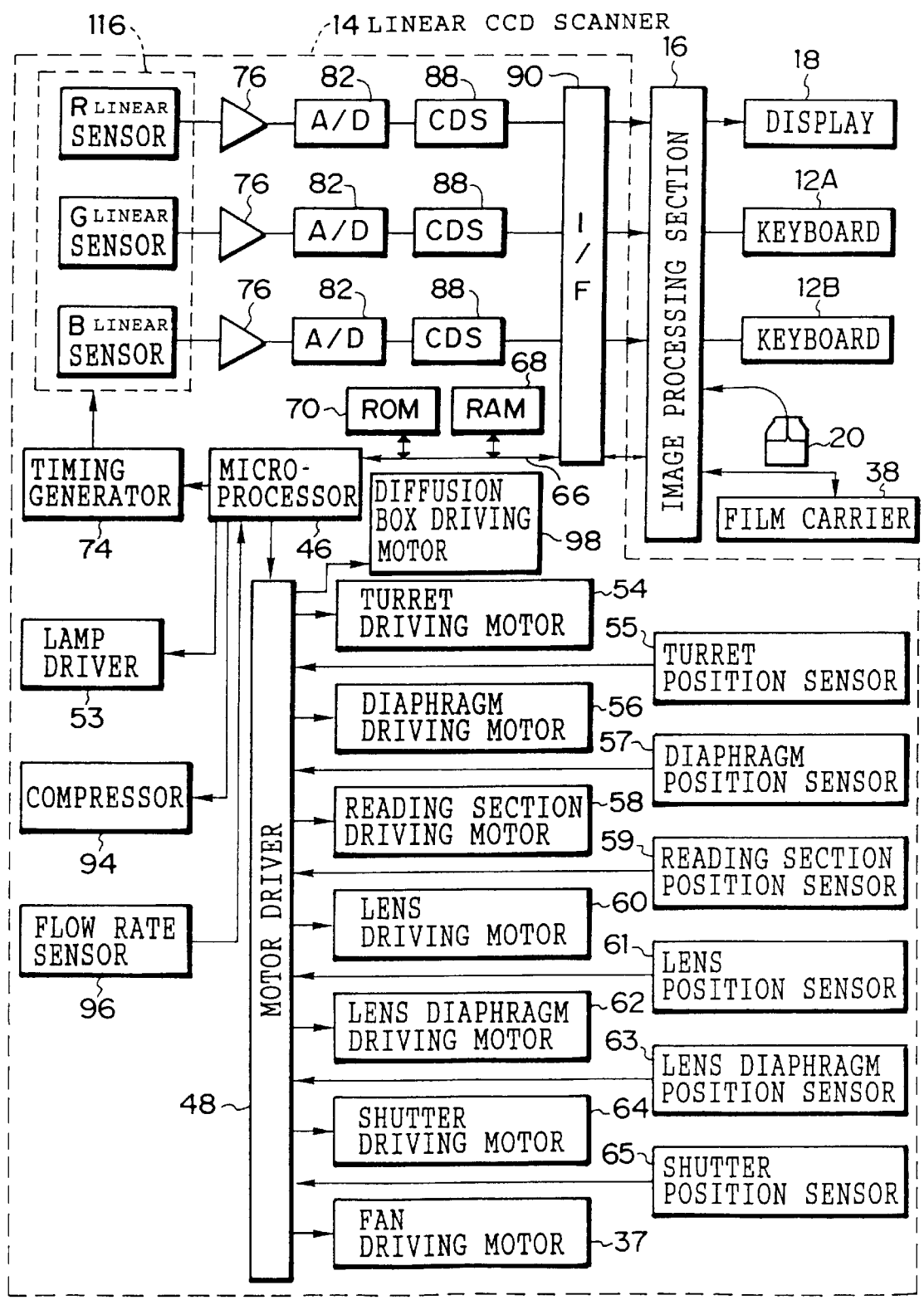
FIG. 7 is a block diagram which schematically shows a structure of an electric system of a linear CCD scanner and an image processing section of the image reading apparatus according to the first embodiment of the present invention.

Next, with reference to principal portions of an optical system of the linear CCD scanner 14 shown in FIG. 6, the schematic structure of an electric system of the linear CCD scanner 14 and of the image processing section 16 will be described while referring to FIG. 7.

The linear CCD scanner 14 includes a microprocessor 46 that controls the entire linear CCD scanner 14. Connected via a bus 66 to the microprocessor 46 are a RAM 68 (for example, a SRAM) and a ROM 70 (for example, a ROM which allows rewriting of contents stored therein). A lamp driver 53, the compressor 94, the flow sensor 96, and a motor driver 48 are also connected to the microprocessor 46.

The lamp driver 53 turns on and off the lamp 32 in response to instructions from the microprocessor 46.

When reading the film images on the photographic film 22, the microprocessor 46 operates the compressor 94 so as to supply cooling air to the photographic film 22. The flow rate of the cooling air is detected by the flow sensor 96, thereby allowing the microprocessor 46 to detect malfunction.

Further, connected to the motor driver 48 is a diffusion box driving motor 98 which causes the diffusion box unit 40 to move slidingly in such a manner that the center of any one of the diffusion boxes 40A and 40B mounted on the diffusion box unit 40 is made to substantially correspond to the optical axis L.

Figure 4B:
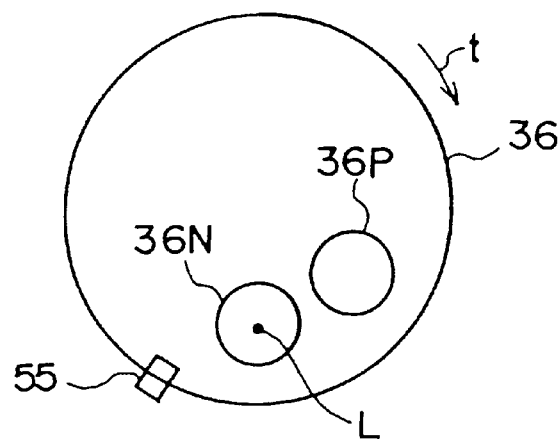
Figure 4C:
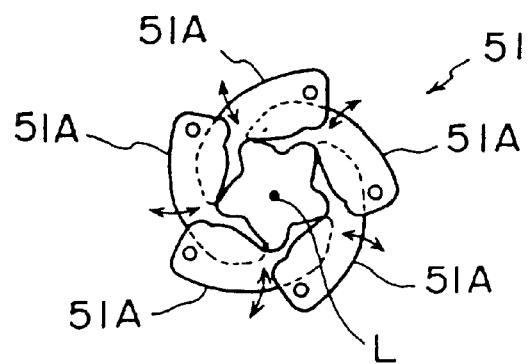
Figure 4D:
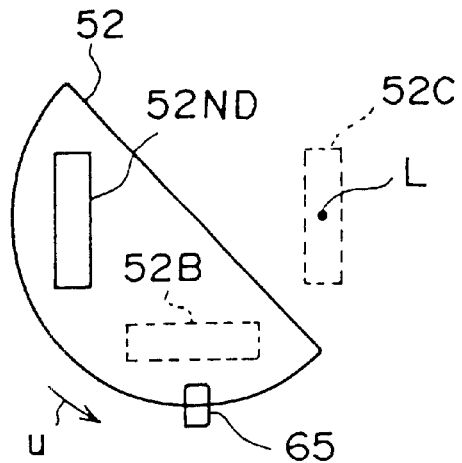

Likewise, connected to the motor driver 48 are a turret driving motor 54 and a turret position sensor 55 (see FIG. 4B also). The turret driving motor 54 drives the turret 36 to rotate in the direction indicated by arrow t in FIG. 4B so that any one of the negative film balance filter 36N and the reversal film balance filter 36P of the turret 37 is positioned on the optical axis L, and the turret position sensor 55 detects a reference position (an unillustrated notch) of the turret 36.

Also connected to the motor driver 48 are a diaphragm driving motor 56 for moving the diaphragm 39 in a sliding manner, a diaphragm position sensor 57 for detecting the position of the diaphragm 39, a reading section driving motor 58 for moving the mounting stand 47 (that is, the linear CCD 116 and the lens unit 50) along the guide rail 42 in a sliding manner, a reading section position sensor 59 for detecting the position of the mounting stand 47, a lens driving motor 60 for moving the lens unit 50 along the lens sleeve 49 in a sliding manner, a lens position sensor 61 for detecting the position of the lens unit 50, a lens diaphragm driving motor 62 for rotating the diaphragm plates 51A of the lens diaphragm 51, a lens diaphragm position sensor 63 for detecting the position of the lens diaphragm 51 (that is, the positions of the diaphragm plates 51A), a shutter driving motor 64 for changing the state of the CCD shutter 52 to any one of the completely closed state, the completely open state, and the reduced light state, a shutter position sensor 65 for detecting the position of the shutter, and a fan driving motor 37 for driving the fan 34.

During the pre-scanning and the fine scanning by the linear CCD 116, based on respective positions of the turret 36 and the diaphragm 39 that are detected by the turret position sensor 55 and the diaphragm position sensor 57, respectively, the microprocessor 46 drives the turret 36 to rotate by the turret driving motor 54 and moves the diaphragm 39 in a sliding manner by the diaphragm driving motor 56, so as to allow adjustment of the light illuminated onto the film image.

Further, the microprocessor 46 determines an optical magnification according to the size of a film image and whether trimming is carried out or not, and moves the mounting stand 47 in a sliding manner by the reading section driving motor 59 based on the position of the mounting stand 47 detected by the reading section position sensor 59, so that the film image is read by the linear CCD 116 at the determined optical magnification. The microprocessor 46 also moves the lens unit 50 in a sliding manner by the lens driving motor 60 based on the position of the lens unit 50 detected by the lens position sensor 61.

When focusing control is carried out in which a light receiving surface of the linear CCD 1 16 is made to coincide with an image-formation position of a film image by the lens unit 50, the microprocessor 46 causes only the mounting stand 47 to move in a sliding manner by the reading section driving motor 58.

In other words, the image-forming relation in the linear CCD scanner 14 of the present embodiment is determined by the relative positions of each of the linear CCD 116, the lens unit 50, and the photographic film 22 in the direction of the optical axis L. In the present embodiment, as described above, when the optical magnification is set, the mounting stand 47 is moved in a sliding manner by the reading section driving motor 58 and the lens unit 50 is moved in a sliding manner by the lens driving motor 60. Therefore, in order to maintain the above-described image-forming relation in a state in which the optical magnification is thus set, the focusing control is carried out by changing the distance between the lens unit 50 and the photographic film 22, while the distance between the linear CCD 116 and the lens unit 50 is kept fixed.

By carrying out the focusing control in the matter described above, fluctuation in the optical magnifications corresponding to the respective film images, at the time when a plurality of film images recorded on the photographic film 22 are read, can be controlled.

In the present embodiment, the focusing control is carried out by the TTL (Through The Lens) system so that the images read by the linear CCD 116 have the maximum contrast.

In the meantime, a timing generator 74 is connected to the linear CCD 116. The timing generator 74 generates various timing signals (clock signals) for operating the linear CCD 116, analog-digital (A/D) converters 82 (which will be described later), and the like.

Output ends of signals from the linear CCD 116 are connected via amplifiers 76 to the A/D converters 82, respectively, and the signals outputted from the linear CCD 116 are each amplified by the amplifier 76 and converted to digital data in the A/D converter 82.

An output end of each A/D converter 82 is connected to the image processing section 16 via a correlation double sampling circuit (CDS) 88 and an interface (I/F) circuit 90. In each CDS 88, feed-through data that represents the level of a feed-through signal and pixel data that represents the level of a pixel signal are each sampled, and the feed-through data is subtracted from the pixel data for each pixel. Then, the CDS 88 sequentially outputs, as scan image data, the calculated results (that is, pixel data which exactly corresponds to respective amounts of charge accumulated in the CCD cells) to the image processing section 16 via the I/F circuit 90.

Photometric signals of R, G, and B are outputted from the linear CCD 116 in parallel, and therefore, three signal processing systems each including the amplifier 76, the A/D converter 82, and the CDS 88 are provided. The image data of R, G, and B are outputted as the scan image data in parallel from the I/F circuit 90 to the image processing section 16.

Also connected to the image processing section 16 are the display 18, the keyboards 12A and 12B, the mouse 20, and the film carrier 38.

In the image processing section 16, darkness correction and light correction are carried out for the image data of R, G, and B inputted in parallel from the linear CCD scanner 14.

The darkness correction is carried out to cancel a dark current which flows through the linear CCD 116 in a state in which light is not made incident on the light incident side of the linear CCD 116, and allows correction of the image data by storing, for each of the cells, data inputted from the linear CCD scanner 14 in a state in which the light incident side of the linear CCD 116 is cut off from light by the CCD shutter 52 (that is, data which represents a darkness output level of each of the cells of the sensing portions of the linear CCD 116), and further by subtracting the darkness output level of the cell corresponding to each pixel from the image data inputted from the linear CCD scanner 14 after the photographic film 22 has been read by the linear CCD 116.

Further, the lightness correction is carried out to correct variation in the photoelectric transfer characteristics of the linear CCD 116 from cell to cell. In a state in which a film image for adjustment having a uniform density over the entire surface thereof is set in the linear CCD scanner 14, a gain (lightness correction data) is set for each cell based on the image data of the film image for adjustment inputted from the linear CCD scanner 14 after the film image for adjustment has been read by the linear CCD 116 (irregularity in the density of each pixel represented by the image data is caused by the variation in the photoelectric transfer characteristics from cell to cell). Then, the image data of the film image to be read, which is inputted from the linear CCD scanner 14, is corrected for each of the pixels according to the gain set for each of the cells.

In the image processing section 16, various image processings are carried out, which include gradation conversion, color conversion, hyper-tone processing for compressing gradation of an ultra-low frequency brightness component of an image, hyper-sharpness processing for highlighting sharpness while controlling graininess, and the like.

Meanwhile, the photographic film 22 corresponds to the document to be read of the present invention, the lamp 32 to the illuminating means thereof, the film carrier 38 to the conveying means thereof, the diffusion boxes 40A and 40B to the light diffusing means thereof, the microprocessor to the controlling means thereof, and the linear CCD 116 to the image sensor thereof.

Next, as operation of the present embodiment, image reading processing of the photographic film 22 executed by the microprocessor 46 in the linear CCD scanner 14 will be described with reference to the flowchart shown in FIG. 8. For the linear CCD scanner 14, respective modes of "pre-scanning mode" and "fine scanning mode" are set in advance as the modes for reading the photographic film, and respective states of various portions of the linear CCD scanner 14 in each of the above-described modes are also set in advance. Further, positioning is set in advance in such a manner that one of the diffusion box 40A and the diffusion box 40B is positioned on the optical axis L when the image reading processing is executed. Moreover, in the present embodiment, there will be described a case in which the photographic film 22 to be read is an elongated negative film.

First, in step 200, diffusion box setting processing for setting the diffusion box according to the type of the photographic film 22 to be read (which will be described later) is executed. In the subsequent step 202, the routine proceeds to the "pre-scanning mode", in which operations of the respective portions are controlled according to the states of the respective portions that are set in advance as the "pre-scanning mode", so that the pre-scanning for the photographic film 22 is carried out under a predetermined reading condition.

In other words, the lamp 32 is turned on by the lamp driver 53, the diaphragm 39 is moved by the diaphragm driving motor 56 to the position for the time of the pre-scanning, the turret 36 is rotated to a negative film position (that is, a position at which the balance filter 36N for a negative film is positioned on the optical axis L) by the turret driving motor 54, the mounting stand 47 and the lens unit 50 are moved in a sliding manner by the reading section driving motor 58 and the lens driving motor 60 so that the optical magnification by the lens unit 50 becomes 1.0, the lens diaphragm 51 is moved to the completely open position by the lens diaphragm driving motor 62, and the CCD shutter 52 is moved to the completely open position by the shutter driving motor 64. With respect to the timing generator 74, the operation time of an electronic shutter of the linear CCD 116 (that is, a reading cycle of the linear CCD 116 per line unit (electric charge accumulation time)) is set at t, which is a minimum value of the operation time. Moreover, the speed at which the photographic film 22 is conveyed by the film carrier 38 is set to 5×v (the conveyance speed five times faster than the speed v at which an ordinary film image is fine scanned), which is a maximum value of the speed. Accordingly, pre-scanning for the photographic film 22 is carried out at a high speed with a relatively coarse resolution and is completed in a short time.

In the subsequent step 204, pre-scanning is started in such a manner that an instruction to convey the photographic film 22 in a predetermined direction (the direction indicted by arrow C in FIG. 2) is given to the film carrier 38, the photographic film 22 conveyed at the maximum conveying speed (5×v) is read by the linear CCD 116 at the shortest reading cycle (t), signals outputted from the linear CCD 116 are sequentially subjected to A/D conversion, and these corrected signals are sequentially outputted, as pre-scan data, to the image processing section 16.

In step 206, it is determined whether the pre-scanning has been carried out right up to the tailing end of the photographic film 22, and the routine is placed in a waiting state until the affirmative determination for step 206 is given.

During the pre-scanning, in the image processing section 16, image data inputted from the linear CCD scanner 14 is sequentially stored in a storage portion (not shown), and at the time when the image data for a plurality of frame images is stored, edge positions at both ends of a film image recorded on the photographic film 22 in the direction in which the photographic film 22 is conveyed (that is, the ends of the film image on the upstream and downstream sides) are each determined based on the stored image data.

The determination of the edge positions can be made, as proposed by the present inventors in Japanese Patent Application Laid-Open (JP-A) Nos. 8-304932, 8-304933, 8-304934, and 8-304935, by calculating, based on a density value for each pixel represented by the pre-scan data, the density variation value along a longitudinal direction of the film for each pixel, adding the density variation value along the longitudinal direction of the film for each pixel per line unit along the transverse direction of the film, and comparing respective added values of every line. Further, when the photographic film 22 is an APS film, a region in which edges may exist from the position where perforations are formed is set as a search range, and by searching for the edges in the search range, the time required for determining the edge positions can also be shortened.

In the image processing section 16, based on the edge positions determined in the above-described manner, a frame position of a film image is determined by the positions of the perforations that correspond to the edges, so that the determined frame position is stored in the above storage portion (not shown). Further, based on the frame position, image data in a region with the film image recorded thereon is cut out from the image data that has been stored by that time, sofas to be stored in the above storage portion (not shown).

Figure 8:
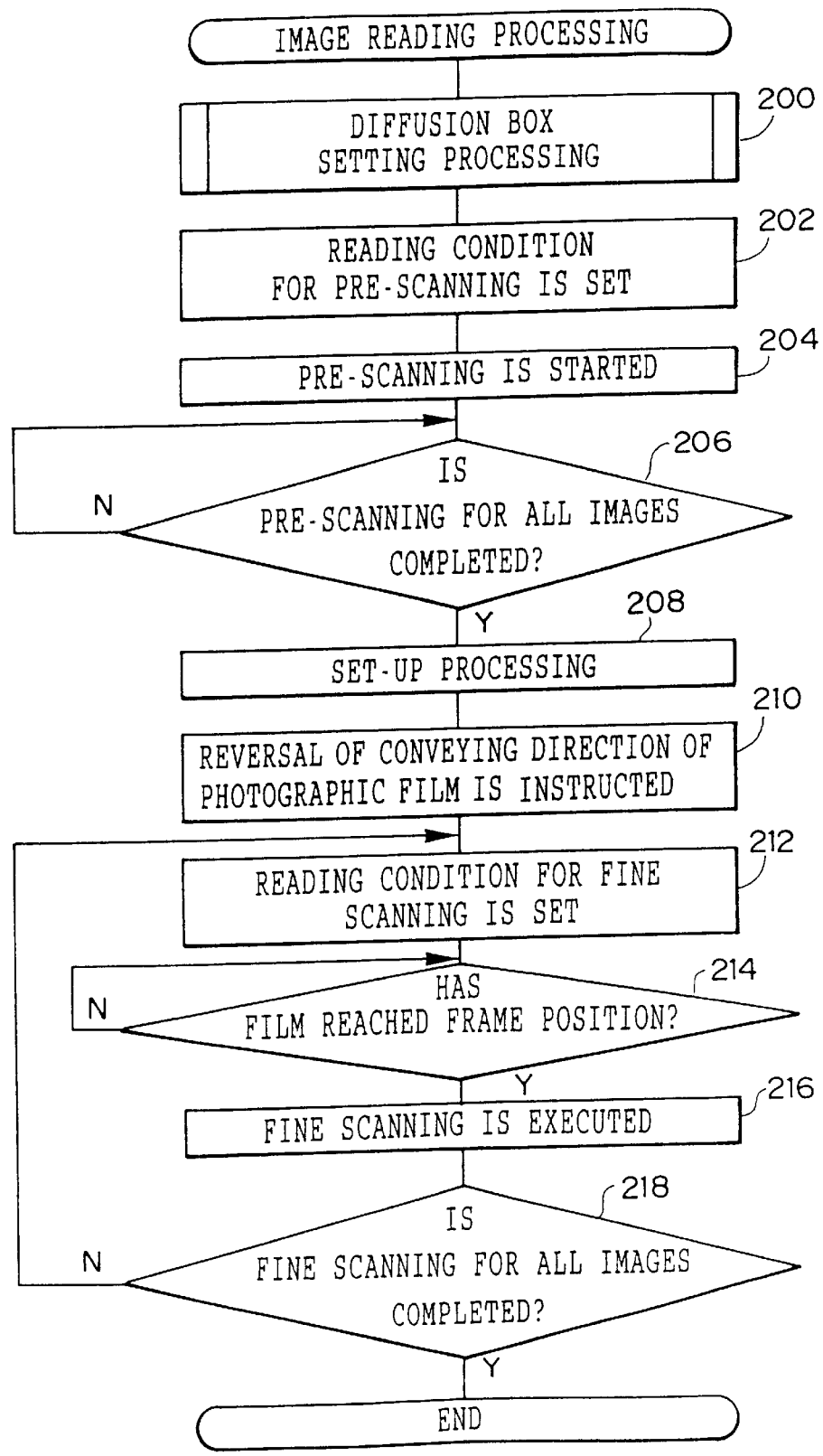
FIG. 8 is a flowchart which shows image reading processing executed by a microprocessor of a linear CCD scanner in the embodiment of the present invention.

When the pre-scanning has been completed to the tailing end of the photographic film 22 (when the determination of step 206 in FIG. 8 is affirmative), in.step 208, predetermined image characteristic amounts of a film image are calculated from the pre-scan image data stored in the above storage portion (not shown) by the image processing section 16 at the time of the pre-scanning. It should be noted that the predetermined image characteristic amounts also include a color balance value of the film image (specifically, a ratio of a minimum density value (or a maximum luminance value) for each of the component colors of the film image).

In step 208, based on the calculated image characteristic amounts, the type of the film image (size and density level) and a processing condition for image processing for the fine scan image data are set by calculation.

When a 135 size photographic film is used as the photographic film 22 to be read, the size of a film image (in this case, the frame size of a film image) can be determined based on, for example, whether the density or color tint of a predetermined portion, the predetermined portion being provided within an image recording range in a standard size film image or being provided outside the image recording range in a nonstandard size film image such as a panorama size film image, corresponds to that of unexposed portions (in a negative film, white regions).

Further, as disclosed in JP-A Nos. 8-304932, 8-304933, 8-304934, and 8-304935, the size (aspect ratio) of a film image may be determined by, based on a density value for each pixel represented by image data at the time of pre-scanning, calculating the density variation value along a transverse direction of the film for each pixel, adding the density variation value along the transverse direction of the film for each pixel per line unit along the longitudinal direction of the film, and comparing respective added values of every line, or may be determined based on a ratio of an image, which is a binary image provided by obtaining a threshold value from a density histogram, existing in each region of the image, or further, may be determined based on the dispersion and average value of the density variation values in the above-described predetermined portion. Alternatively, the size of a film image may also be determined using a combination of the above-described methods.

When an APS film is used as the photographic film 22 to be read, the size of a film image (in this case, the print size) can be determined by reading the print size magnetically recorded, as data, on a magnetic layer of the APS film.

The density level of a film image can be determined based on the density classification of low density, normal density, high density, ultra high density, and the like by comparing, for example, average density, maximum density, minimum density or the like with predetermined values. Further, as the processing conditions for image processing, for example, an enlargement/reduction ratio of an image, processing conditions for image processing such as hyper-tone or hyper-sharpness (specifically, the degree of compression of gradation to an ultra low frequency brightness component of an image, or the gain (the degree of highlighting) for a high frequency component or an intermediate frequency component of an image), and gradation conversion conditions are calculated.

When the setting of the type and the processing conditions for image processing for each of all frame images is completed as described above, in the subsequent step 210, an instruction to convey the photographic film 22 in a direction opposite to the above-described predetermined direction (that is, a direction opposite to that indicated by arrow C in FIG. 2) is given to the film carrier 38 so as to make preparations for fine scanning of a film image.

In the subsequent step 212, operation of the various portions of the linear CCD scanner 14 is controlled such that the fine scanning for the film image is carried out under a reading condition suitable for the type of the film image to be subsequently subjected to the fine scanning.

First, the type of the film image to be subsequently subjected to the fine scanning (in this case, the film image that reaches the reading position first when the photographic film 22 is conveyed in the direction opposite to the predetermined direction) is fetched such that a determination as to the type of the film image is made. Further, setting of a fine scanning mode in accordance with the determined type is carried out. For example, when the type is determined to be a "high density frame", operation of the various portions is controlled according to the respective states of the various portions that has been set in advance as a fine scanning mode for a high density frame.

Specifically, the lamp 32 is turned on, the diaphragm 39 is moved to the position for the time of the fine scanning for a high density frame, the turret 36 is rotated to a negative film position, and the mounting stand 47 and the lens unit 50 are moved in a sliding manner so that the optical magnification by the lens unit 50 becomes 1.0. With respect to the timing generator 74, the operation time (reading cycle) of the electronic shutter of the linear CCD 116 is set at t, and the speed at which the photographic film 22 is conveyed by the film carrier 38 is set at v. As the amount of light transmitted through a high-density film image is small, in order that the high-density film image is read with high accuracy in a high dynamic range, the diaphragm 39 at the time of the fine scanning for a high-density frame is located at a position that is nearly a completely open position.

In the subsequent step 214, based on a frame position stored in the storage portion (not shown) of the image processing section 16, a determination is made as to whether the edges of the film image to be subsequently subjected to the fine scanning have reached the reading position of the linear CCD 116 (the position on the optical axis). The routine is placed in a waiting state until the affirmative determination for step 214 is given.

When the determination of step 214 is affirmative, the routine proceeds to step 216, in which the fine scanning is carried out in such a manner that the film image which has reached the reading position is read by the linear CCD 116, signals outputted from the linear CCD 116 are sequentially subjected to A/D conversion and then are sequentially outputted, as fine scan image data, to the image processing section 16. As a result, fine scanning for the film image is carried out under an optimum reading condition for each type of film image.

The fine scan image data outputted from the linear CCD scanner 14 to the image processing section 16 is subjected to image processing in the image processing section 16 under the processing conditions that have been stored in advance, so as to be outputted to a laser printer section (not shown) for printing.

When the fine scanning for a single film image is completed, the routine proceeds to step 218, in which it is determined whether the fine scanning for all the film images has been completed. When the determination of step 218 is negative, the routine returns to step 212 and the routine from step 212 to step 218 is executed repeatedly. In the above steps 212 to 218, the fine scanning for each film image is carried out under an optimum reading condition in accordance with the type of each film image. When the decision of step 218 is affirmative, the present image reading processing is completed.

Next, a description will be given of the diffusion box setting processing (that is, the processing in step 200 in FIG. 8) that is executed by the microprocessor 46 of the linear CCD scanner 14.

First, in step 300, the type of the photographic film 22 is detected. It should be noted that in the present embodiment, the type of the photographic film 22 is detected based on the type of the film carrier 38 set on the work table 27. In other words, in the present embodiment, film carriers are provided for each type of photographic film so that the type of the photographic film to be read can be recognized by the type of the film carrier set on the work table 27.

Further, the image reading apparatus of the present embodiment is structured, as described above, in such a manner that the type of the film carrier that is set can be detected by the combination of on and/or off states of the plurality of microswitches (not shown) that is provided at the film carrier. Accordingly, by detecting the above-described states of the microswitches, the type of the film carrier that is set can be specified, which in turn allows specification of the type of the photographic film 22 depending on the type of the film carrier.

After the detection, of the type of the photographic film 22 is completed, in the subsequent step 302, a determination is made as to whether the type of the photographic film 22 that has been detected is a photographic film of a Brownie size or not. If it is determined that it is not a photographic film of a Brownie size, the routine proceeds to step 304, in which it is determined whether the detected type of the photographic film 22 is a photographic film whose width is 35 mm or less. If it is determined that it is not a photographic film whose width is 35 mm or less, the step proceeds to step 306, in which the routine returns to the above step 300 after an error message is displayed on the display 18.

In other words, when the answers to the determinations in both step 302 and 304 are negative, the film carrier that is set is not intended for a photographic film to be read by the image reading apparatus of the present embodiment. Therefore, an error message indicating such is displayed on the display 18. When such a message is displayed on the display 18, the operator exchanges the film carrier to the one intended for the photographic film to be read.

In the meantime, when it is determined, as the result of the determination in step 302, that the type of the photographic film 22 is a photographic film of a Brownie size, the routine proceeds to step 308. In step 308, a determination is made as to whether the diffusion box that is currently set on the optical axis L is the diffusion box 40A (that is, the diffusion box for a Brownie size). When it is determined that it is not the diffusion box 40A, the routine proceeds to step 310, in which the center of the diffusion box 40A is set so as to substantially correspond to the optical axis L by moving the diffusion box unit 40 in a sliding manner with the diffusion box driving motor 98. On the other hand, when it is determined in the above step 308 that the diffusion box that is set is the diffusion box 40A, the diffusion box setting processing is completed without carrying out the processing of the above step 310, that is, the sliding movement of the diffusion box unit 40.

Further, when it is determined, as the result of the determination in step 304, that the type of the photographic film 22 is a photographic film whose width is 35 mm or less, the routine proceeds to step 312. In step 312, a determination is made as to whether the diffusion box that is currently set on the optical axis L is the diffusion box 40B (that is, the diffusion box for a size whose width is 35 mm or less). When it is determined that it is not the diffusion box 40B, the routine proceeds to step 314, in which the center of the diffusion box 40B is set so as to substantially correspond to the optical axis L by moving the diffusion box unit 40 in a sliding manner with the diffusion box driving motor 98. On the other hand, when it is determined in the above step 312 that the diffusion box that is set is the diffusion box 40B, the diffusion box setting processing is completed without carrying out the processing of the above step 314, that is, the sliding movement of the diffusion box unit 40.

As described above in detail, in the image reading apparatus according to the first embodiment, the type of the photographic film is detected so that a diffusion box corresponding to the detected type of the photographic film is set at a predetermined position. Accordingly, labor imposed upon the operator can be reduced compared with the case in which a diffusion box is provided for each type of photographic film and the operator sets the diffusion box according to the type of the photographic film. At the same time, errors in the setting of the diffusion box (such as an error in the choice of the diffusion box, an error in the setting procedure of the diffusion box, and the like) can be prevented from being made.

Figure 5B:
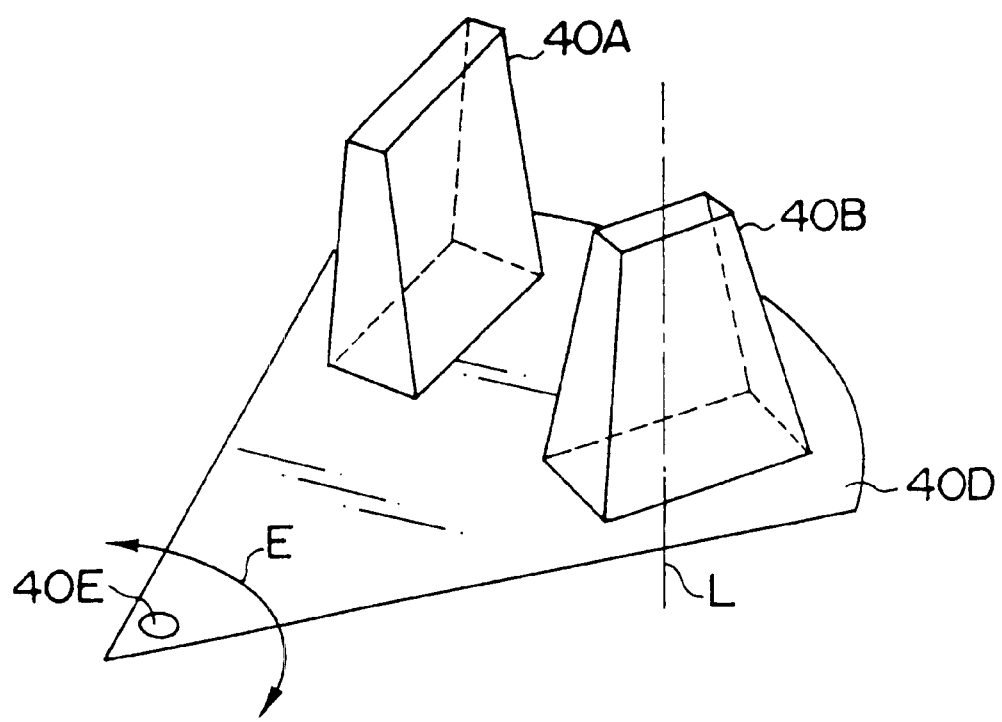

In the present embodiment, there has been described a case in which each of the diffusion boxes is set according to the type of the photographic film by mounting rectilinearly two types of diffusion boxes on the plate member 40C so that the plate member 40C is moved rectilinearly in a sliding manner. However, the present invention is not limited to the same. For example, as shown in FIG. 5B, a structure may be employed in which a diffusion box in accordance with the type of the photographic film 22 is set by mounting the diffusion boxes 40A and 40B on a plate member 40D in the shape of an arc and further by driving the plate member 40D to rotate on the axis 40E, so that the center of one of the diffusion boxes substantially corresponds to the optical axis L.

Further, in the first embodiment, there has been described a case in which a desired diffusion box is set on the optical axis by disposing two types of diffusion boxes along the directions in which the sub-scanning is carried out (in the directions indicated by double-headed arrow D in FIG. 2) and further by moving the diffusion box according to the type of the photographic film 22 in a sliding manner along the directions in which the sub-scanning is carried out. However, the present invention is not limited to the same. For example, a structure may be employed in which a desired diffusion box is set on the optical axis by disposing two types of diffusion boxes along the direction in which the main scanning is carried out and which is orthogonal to the direction in which the sub-scanning is carried out and further by moving the diffusion box in a sliding manner along the direction in which the main scanning is carried out.

Second Embodiment

In a second embodiment, a structure will be described in which a diffusion box in accordance with the type of a photographic film is set on the optical axis L by moving the diffusion box in two stages, i.e., by moving the diffusion box in the directions in which the main scanning is carried out and further by moving the diffusion box in the directions in which the sub-scanning is carried out. It should be noted that the structure of the image reading apparatus in the second embodiment is the same as in the above-described first embodiment except for the portions relating to the diffusion boxes, and the processing in the image reading processing (see FIG. 8) is the same as in the above-described first embodiment except for the diffusion box setting processing. Accordingly, a description thereof is omitted here.

First, a description will be given of the diffusion boxes and the structures in the vicinity thereof in the second embodiment with reference to a schematic plan view shown in FIG. 10.

Figure 10:
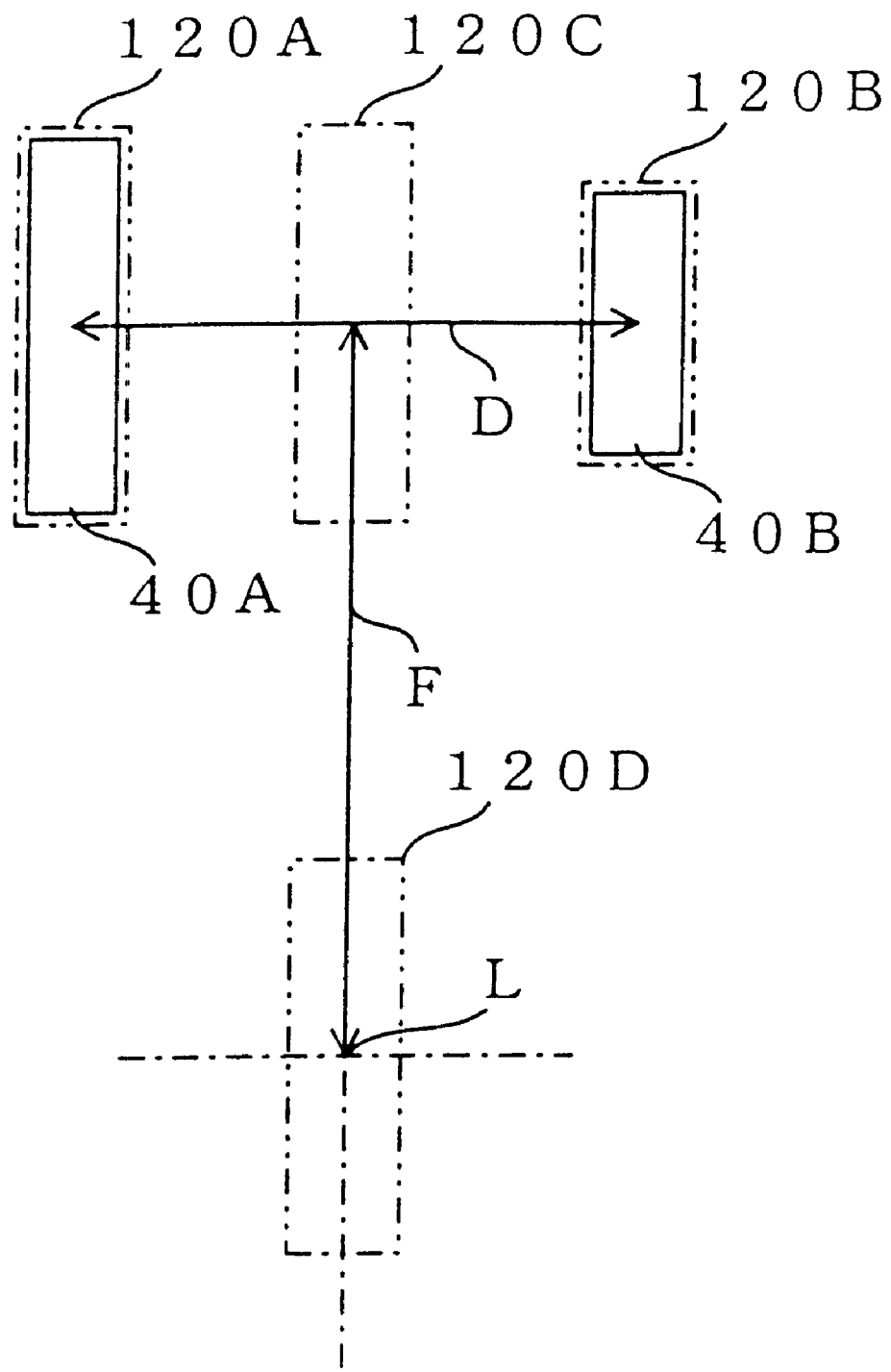
FIG. 10 is a schematic plan view which shows diffusion boxes and a structure of the vicinity thereof in an image reading apparatus according to a second embodiment.

As shown in FIG. 10, in the image reading apparatus of the second embodiment, the diffusion box 40A for a Brownie size and the diffusion box 40B for a size whose width is 35 mm or less are disposed at a first disposing position 120A and at a second disposing position 120B, respectively, which are substantially identically central positions in the main scanning directions F in the vicinity of the working surface 27U of the working table 27.

The diffusion box 40A is structured so as to be able to move in the sub-scanning directions D by a sub-scanning direction driving motor (which will be described later). The diffusion box 40A can be located at any one of the two disposing positions, i.e., a first disposing position 120A, and a third disposing position 120C which is substantially halfway between the first disposing position 120A and the second disposing position 120B, and whose sub-scanning direction is made substantially identical to that of a fourth disposing position 120D having the optical axis L as a center thereof. The diffusion box 40A located at the third disposing position 120C is structured so as to be able to move in the main scanning directions F by a main scanning direction driving motor (which will be described later). Therefore, it can be located at any one of the two disposing positions, i.e., the third disposing position 120C and the fourth disposing position 120D.

Further, the diffusion box 40B is structured so as to be movable in the sub-scanning directions D by the sub-scanning direction driving motor, and can be located at any one of the two disposing positions, i.e., the second disposing position 120B and the third disposing position 120C. The diffusion box 40B located at the third disposing position 120C is structured so as to be movable in the main scanning directions F by the main scanning direction driving motor, and can be located at any one of the two disposing positions, i.e., the third disposing position 120C and the fourth disposing position 120D.

Next, with reference to FIG. 11, a schematic structure of an electric system of the linear CCD scanner 14 and the image processing section 16 in the second embodiment will be described.

Figure 11:
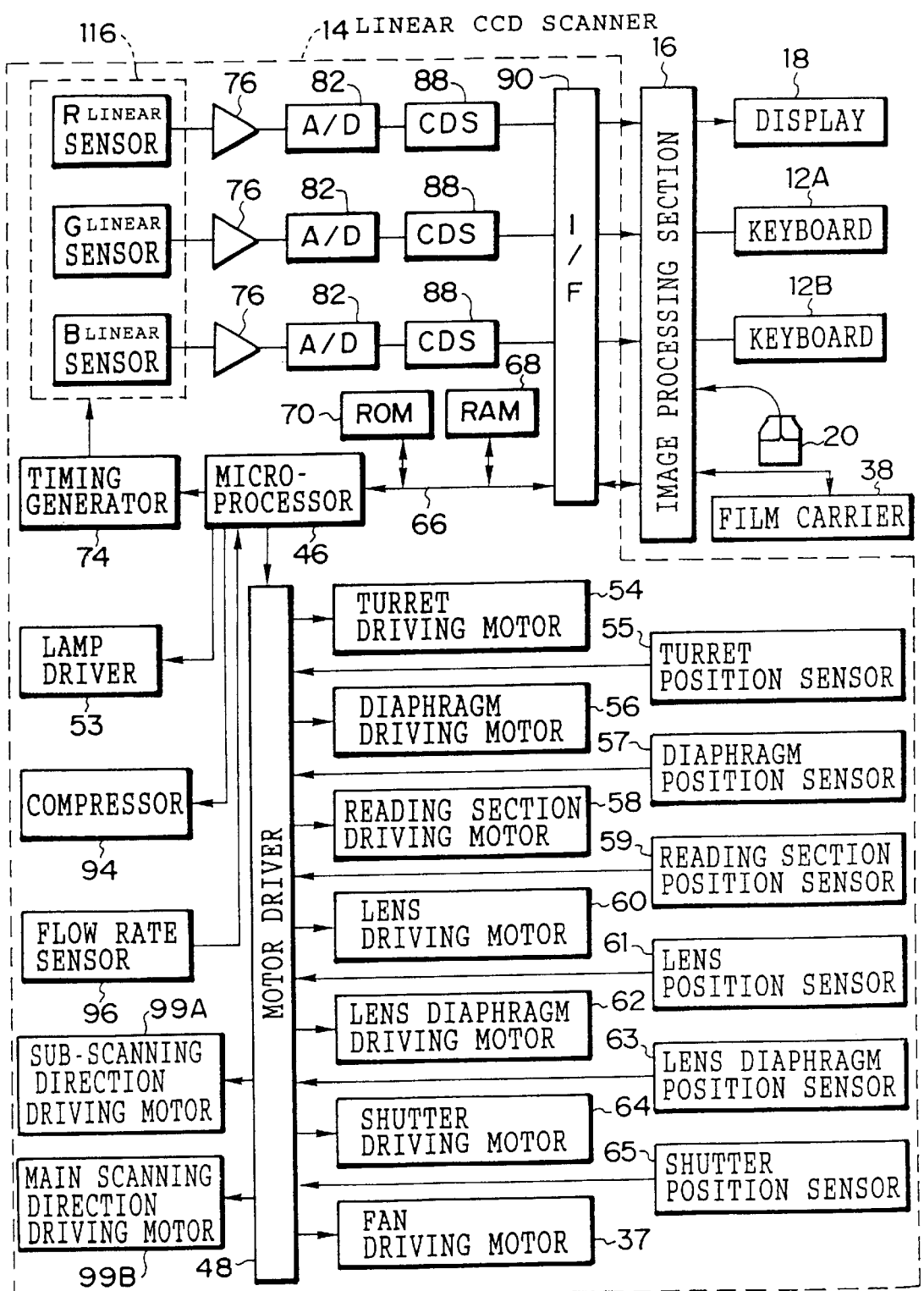
FIG. 11 is a block diagram which schematically shows a structure of an electric system of a linear CCD scanner and an image processing section of the image reading apparatus according to the second embodiment of the present invention.

As shown in FIG. 11, compared with the structure of the above-described first embodiment (see FIG. 7 also), the structure of the electric system of the linear CCD scanner 14 in the second embodiment differs in that it is not provided with the diffusion box driving motor 98 but the sub-scanning direction driving motor 99A and the main scanning direction driving motor 99B are each connected to the motor driver 48. The sub-scanning direction driving motor 99A is used to move the diffusion boxes 40A and 40B in the direction in which sub-scanning is carried out, and the main scanning direction driving motor 99B is used to move the diffusion boxes 40A and 40B in the direction in which main scanning is carried out. Accordingly, the microprocessor 46 can not only dispose the diffusion box 40A at any disposing position of the first disposing position 120A, the third disposing position 120C and the fourth disposing position 120D but also dispose the diffusion box 40B at any disposing position of the second disposing position 120B, the third disposing position 120C and the fourth disposing position 120D.

Figure 9:
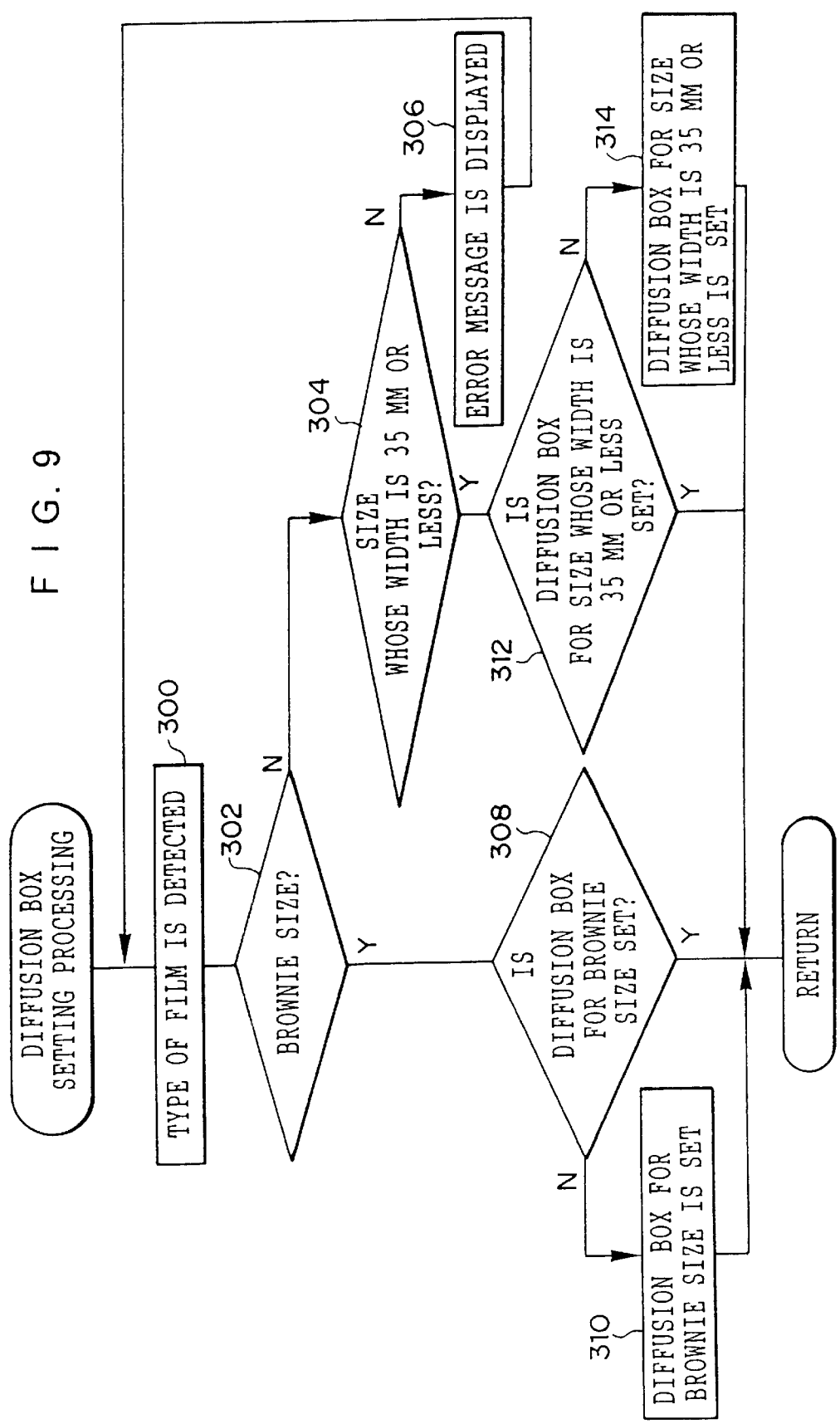
FIG. 9 is a flowchart which shows diffusion box setting processing executed in the first embodiment during execution of the image reading processing of FIG. 8.

Next, diffusion box setting processing in the second embodiment will be described with reference to the flow-chart shown in FIG. 12. Since the processing in steps 300 through 306 of the diffusion box setting processing in the second embodiment is the same as in the above-described first embodiment (see FIG. 9 also), a description thereof is omitted. Further, prior to the execution of the diffusion box setting processing, one of the diffusion box 40A and the diffusion box 40B has been disposed at the fourth disposing position 120D (on the optical axis L).

When it is determined in step 302 that the type of the photographic film 22 to be read is a photographic film of a Brownie size, the routine proceeds to step 320. In step 320, a determination is made as to whether or not the diffusion box 40A for a Brownie size is set (disposed) at the fourth disposing position 120D. When the diffusion box 40A is not disposed, it is assumed that the diffusion box 40B for a size whose width is 35 mm or less is disposed, and the routine proceeds to step 322. In step 322, the diffusion box 40B is retracted by moving the diffusion box 40B from the fourth disposing position 120D to the third disposing position 120C with the main scanning direction driving motor 99B, and further by moving the diffusion box 40B from the third disposing position 120C to the second disposing position 120B with the sub-scanning direction driving motor 99A, and the routine proceeds to step 324. In step 324, the diffusion box 40A is disposed in such a manner that the center of the diffusion box 40A substantially corresponds to the optical axis L by moving the diffusion box 40A from the first disposing position 120A to the third disposing position 120C with the sub-scanning direction driving motor 99A, and further by moving the diffusion box 40A from the third disposing position 120C to the fourth disposing position 120D with the main scanning direction driving motor 99B, and the diffusion box setting processing is completed.

In the meantime, when it is determined in step 320 that the diffusion box 40A for a Brownie size is set at the fourth disposing position 120D, the diffusion box setting processing is completed without carrying out the processings in the above steps 322 and 324.

Further, when it is determined in step 304 that the type of the photographic film 22 to be read is the photographic film whose width is 35 mm or less, the routine proceeds to step 326. In step 326, a determination is made as to whether or not the diffusion box 40B for a size whose width is 35 mm or less is set (disposed) at the fourth disposing position 120D. When the diffusion box 40B is not disposed, it is assumed that the diffusion box 40A for a Brownie size is disposed, and the routine proceeds to step 328. In step 328, the diffusion box 40A is retracted by moving the diffusion box 40A from the fourth disposing position 120D to the third disposing position 120C with the main scanning direction driving motor 99B, and further by moving the diffusion box 40A from the third disposing position 120C to the first disposing position 120A with the sub-scanning direction driving motor 99A, and the routine proceeds to step 330. In step 330, the diffusion box 40B is disposed in such a manner that the center of the diffusion box 40B substantially corresponds to the optical axis L by moving the diffusion box 40B from the second disposing position 120B to the third disposing position 120C with the sub-scanning direction driving motor 99A, and further by moving the diffusion box 40B from the third disposing position 120C to the fourth disposing position 120D with the main scanning direction driving motor 99B, and the diffusion box setting processing is completed.

In the meantime, when it is determined in step 326 that the diffusion box 40B for a size whose width is 35 mm or less is set at the fourth disposing position 120D, the diffusion box setting processing is completed without carrying out the processings of the above-described steps 328 and 330.

As described above in detail, in the image reading apparatus according to the second embodiment, the diffusion box in accordance with the type of the photographic film to be read is set at a predetermined position by structuring two types of diffusion boxes in such a manner as to be movable in two directions, i.e., in the direction in which main scanning is carried out, and in the direction in which sub-scanning is carried out. Accordingly, a common driving motor can be used to carry out the movements in the main scanning direction and in the sub-scanning direction of each of the two diffusion boxes, to thereby allow low-cost structuring as well as miniaturization of the image reading apparatus.

In the second embodiment, there has been described a case in which the diffusion box in accordance with the type of the photographic film is set at the position of the optical axis by moving the diffusion box first in the direction in which the sub-scanning is carried out and then in the direction in which the main scanning is carried out. However, the present invention is not limited to the same, and a structure may be employed in which a diffusion box in accordance with the type of the photographic film may be set at the position of the optical axis by moving the diffusion box first in the direction in which the main scanning is carried out and then in the direction in which the sub-scanning is carried out.

Further, in the second embodiment, there has been described a case in which two types of diffusion boxes are disposed in the direction in which sub-scanning is carried out, and the diffusion box in accordance with the photographic film is set at the position of the optical axis by moving the diffusion box first in the direction in which the sub-scanning is carried out, and then in the direction in which the main scanning is carried out. However, the present invention is not limited to the same. For example, a structure may be employed in which two types of diffusion boxes have been disposed in the direction in which the main scanning is carried out, and the diffusion box in accordance with the photographic film is set at the position of the optical axis by moving the diffusion box first in the direction in which the sub-scanning is carried out, and then in the direction in which the main scanning is carried out.

Third Embodiment

In a third embodiment, a description will be given of a structure in which a single diffusion box can be used for a plurality of types of photographic films by structuring the diffusion box with movable side walls (a structure corresponding to the inventions described in the sixth and seventh aspects). It should be noted that the structure of the image reading apparatus in the third embodiment is the same as in the above-described first and second embodiments except for the portions relating to the diffusion box, and the processing in the image reading processing (see FIG. 8) in the third embodiment is the same as in the above-described first and second embodiments except for the diffusion box setting processing. Accordingly, a description thereof is omitted here.

First, a description will be given of a structure of a diffusion box in the third embodiment with reference to FIGS. 13A and 13B.

As shown in FIGS. 13A and 13B, a diffusion box 41 in the third embodiment is structured in such a manner that an outer periphery thereof is in the form of a hollow structure with four side walls comprising a pair of first side walls 41A and a pair of second side walls 41B. The pair of first side walls 41A is structured in such a manner that each of the first side walls is able to rotate on an axis (now shown) at a lower end side thereof so that each of the upper end sides of the first side walls is moved in the directions indicated by arrows H around the central axis G. The pair of second side walls 41B is structured in such a manner that each of the second side walls is able to rotate on an axis (not shown) at a lower end side thereof so that each of the upper end sides of the second side walls is moved in the directions indicated by arrow I around the central axis G. It should be noted that the rotations of the first side walls 41A can be carried out by a first driving motor (which will be described later) and the rotations of the second side walls 41B can be carried out by a second driving motor (which will be described later).

The internal surface of the diffusion box 41 is made of a mirror surface, and a light diffusion panel (not shown) is mounted at a lower end portion. The light diffusion box 41 can make the light, which has entered from the lower end portion, into diffused light, and emit the diffused light from an upper end portion.

The diffusion box structured in the above-described manner is set between the light source portion 30 and the film carrier 38 so that the optical axis L substantially corresponds to the central axis G, and the first side walls 41A extend along the direction in which the main scanning is carried out. Accordingly, by rotating the second side walls 41B in such a manner that the upper end portions of the pair of second side walls 41 B are able to move toward and apart from each other, the illumination range for the transverse direction of the photographic film 22 can be changed.

Next, with reference to FIG. 14, a schematic structure of an electric system of the linear CCD scanner 14 and the image processing section 16 in the third embodiment will be described. As shown in FIG. 14, compared with the structure of the above-described first embodiment (see FIG. 7 also), the structure of the electric system of the linear CCD scanner 14 in the third embodiment differs in that it is not provided with the diffusion box driving motor 98, but a first driving motor 99C for rotating the first side walls 41A and a second direction driving motor 99D for rotating the second side walls 41B are each connected to the motor driver 48. Accordingly, the microprocessor 46 can carry out the rotation of the first side walls 41A of the diffusion box 41 in the directions indicated by arrows H as well as the rotation of the second side walls 41B in the directions indicated by arrows I, by driving the first driving motor 99C and the second driving motor 99D via the motor driver 48. The diffusion box 41 corresponds to the light diffusing means of the present invention.

Next, diffusion box setting processing in the third embodiment will be described with reference to the flowchart shown in FIG. 15. Since the processing of steps 300 through 306 of the diffusion box setting processing in the third embodiment is the same as that in the above-described first embodiment (see FIG. 9 also), a description thereof is omitted. Further, prior to the execution of the diffusion box setting processing, a state of the diffusion box 41 has been set at any one of a state indicated by the solid lines in the FIGS. 13A and 13B (that is, a state for a size whose width is 35 mm or less, which is hereinafter referred to as a first state), and a state indicated by the alternate long and two short dashes lines in the FIG. 13A and 13B (that is, a state for a Brownie size, which is hereinafter referred to as a second state). Further, the state of the first side walls 41A as shown in FIG. 13B is hereinafter referred to as a closed state, and the state in which the upper end portions of the first side walls 41A are slightly spaced apart from each other compared with the above-described closed state is hereinafter referred to as an open state.

When it is determined in step 302 that the type of the photographic film 22 to be read is a photographic film of a Brownie size, the routine proceeds to step 350. In step 350, a determination is made as to whether or not the diffusion box 41 is set in the second state, in other words, in the state for a Brownie size. When it is determined that the diffusion box 41 is not set for a Brownie size, the routine proceeds to step 352. In step 352, the first side walls 41A are moved to the open state by the first driving motor 99C, and then in step 354, the second side walls 41B are moved to the second state by the second driving motor 99D. Subsequently, in step 356, the first side walls 41A are moved to the closed state by the first driving motor 99C, and the diffusion box setting processing is completed.

In other words, when it is determined in step 350 that the diffusion box 41 is not set for a Brownie size, a series of processings of steps 352 through 356 is effected. First, the first side walls 41A are moved to the open position so as to facilitate the movement of the second side walls 41B. Then, the second side walls 41B are moved to the position for a Brownie size. Subsequently, spaces between the respective side walls are filled by closing the first side walls 41A.

On the other hand, when it is determined in step 350 that the diffusion box 41 is set in the second state, the diffusion box setting processing is completed without carrying out the processing of the above-described steps 352 through 356.

Further, when it is determined in step 304 that the type of the photographic film to be read is a photographic film whose width is 35 mm or less, the routine proceeds to step 358. In step 358, a determination is made as to whether or not the diffusion box 41 is set in the first state, in other words, in the state for a size whose width is 35 mm or less. When it is determined that the diffusion box 41 is not set in the state for a size whose width is 35 mm or less, the routine proceeds to step 360. In step 360, the first side walls 41A are moved to the open state by the first driving motor 99C, and then in step 362, the second side walls 41B are moved to the first state by the second driving motor 99D. Subsequently, in step 364, the first side walls 41A are moved to the closed state by the first driving motor 99C, and the diffusion box setting processing is completed.

In other words, when it is determined in step 358 that the diffusion box 41 is not set for a size whose width is 35 mm or less, a series of processings of steps 360 through 364 is effected, in the same manner as the processings of the above steps 352 through 356. First, the first side walls 41A are moved to the open position so as to facilitate the movement of the second side walls 41B. Then, the second side walls 41B are moved to the position for a size whose width is 35 mm or less. Subsequently, spaces between the respective side walls are filled by closing the first side walls 41A.

On the other hand, when it is determined in step 358 that the diffusion box 41 is set in the first state, the diffusion box setting processing is completed without carrying out the processing of the above-described steps 360 through 364.

As described above in detail, in the image reading apparatus according to the third embodiment, the diffusion box that is used for two types of photographic films can be structured by a single diffusion box. Accordingly, compared with the case in which a diffusion box is provided for each type of photographic film, a region for installing the diffusion box can be made smaller, thereby allowing miniaturization as well as reduced cost of the apparatus.

Further, in the image reading apparatus according to the third embodiment, the first side walls are moved to the open position before the second side walls are moved, and to the closed position after the second side walls have been moved. Accordingly, since the second side walls do not come into contact with the first side walls when the second side walls are moved, the second side walls can be moved by using a low amount of energy and the respective side walls can be prevented from being damaged.

In the third embodiment, there has been described a case in which the diffusion box 41 is used for two types of photographic films by allowing the second side walls 41B to move in two stages. However, the present invention is not limited to the same, and for example, a structure may be employed in which a diffusion box can be used for 3 or more types of photographic films by allowing the second side walls 41B to move in sequence.

Likewise, in each of the embodiments described above, there has been described a case in which the type of the photographic film 22 to be read is specified based on the type of the film carrier 38 set on the work table 27. However, the present invention is not limited to the same, and for example, a structure may be employed in which the type of a photographic film can be specified by reading a DX code when the DX code is attached on the photographic film, or by reading the content of a magnetic recording layer formed on the photographic film when the photographic film to be read is an APS film.

In each of the embodiments described above, there has been also described a case in which, as light diffusing means, two types of diffusion boxes, i.e., the light diffusion box for a film whose size in the transverse direction is 35 mm or less, and the light diffusion box for a film of a Brownie size are applied. However, the present invention is not limited to the same, and for example, a structure may be employed in which 3 or more types of diffusion boxes are applied.

In each of the embodiments described above, there has been further described a case in which the linear CCD 116 is applied as an image sensor of the present invention so that the diffusion box emits the incident light in the shape of a silt. However, the present invention is not limited to the same, and for example, a structure may be employed in which an area CCD is applied as an image sensor of the present invention so that the diffusion box emits incident light in the shape of a rectangle.

Additionally, in each of the embodiments described above, there has been described a case in which the photographic film 22 is a negative film. However, the present invention is not limited to the same, and it goes without saying that the present invention can be applied to the reading of a reversal film (positive film).

In each of the embodiments described above, there has been further described a case in which the size of photographic film is applied as a reading condition of the present invention. However, the present invention is not limited to the same, and, for example, the following two types of condition can be applied.

Whether the scanning to be carried out is pre-scanning or fine scanning.

Whether the printing is a simultaneous film processing or a reprinting.

In other words, in each of the above-described embodiments, as the frame position of the frame image is determined at the time of pre-scanning by referring to the position of the corresponding perforations and the like, there is a need, at the time of pre-scanning, to obtain image data that includes even perforations located outside the frame image. Accordingly, at the time of pre-scanning, there is a need to illuminate a broader area than that of the frame image, which results in a broader illumination range compared with the time of fine scanning. As a result, an appropriate illumination range corresponding to the reading conditions (whether it is pre-scanning or fine scanning) can be set.

Further, there are also occasions when scratches on the photographic film are present when the original to be read is a photographic film and reprints are made thereof. Therefore, the degree of diffusion of the illumination light is increased at the time of reprinting, compared with during simultaneous film processing, in order to reduce the scratches appearing on the print. Conversely, during simultaneous film processing, because there are hardly any scratches on the photographic film, the degree of diffusion is decreased thus allowing increased processing performance.

Still further, in each of the embodiments described above, there has been described a case in which the lamp 32 is applied as the illumination means of the present invention and the illumination range is automatically changed by using the plurality of diffusion boxes selectively or by changing the size of emitting openings of the illumination light of the diffusion boxes. However, the present invention is not limited to the same. For example, a structure may be employed in which when the illuminating means that is configured to include a plurality of light emitting portions disposed linearly or in the form of an array (in two dimensions) is applied as the illuminating means of the present invention, the illumination range is automatically changed by turning on, among the above plurality of light emitting portions, only the ones that correspond to the range to be illuminated.

Figure 16A:
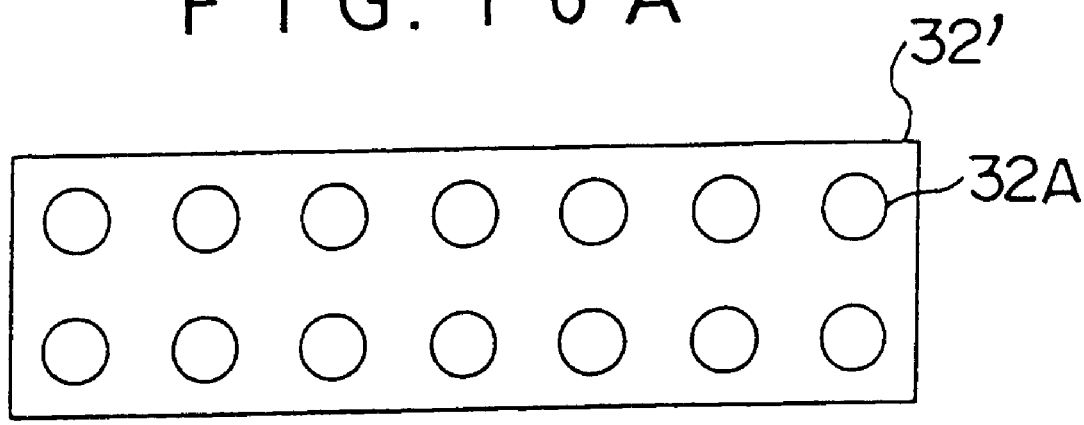
FIGS. 16A and 16B each show an explanatory drawing which illustrates a fourth embodiment of the present invention.
Figure 16B:
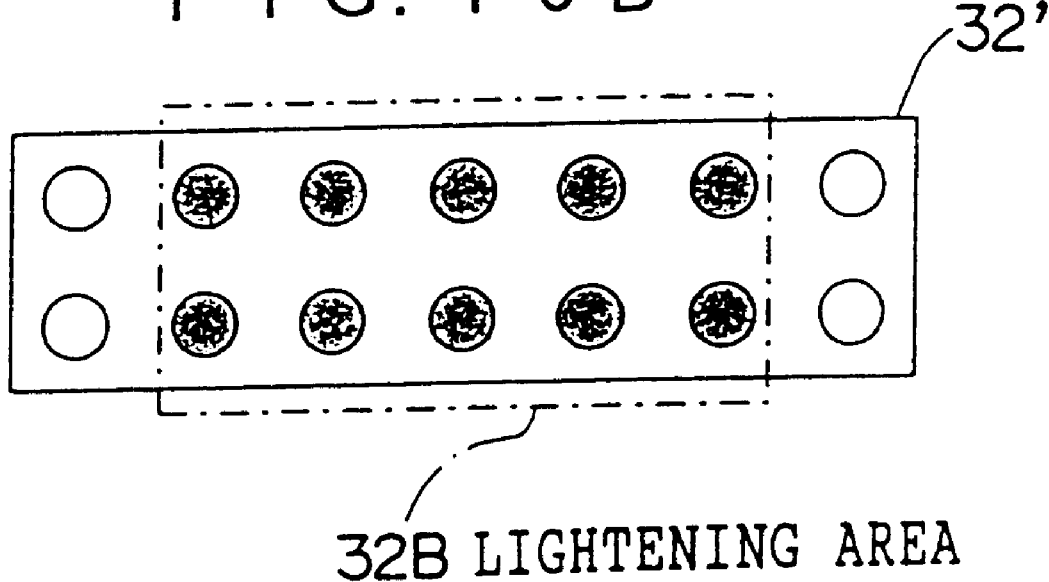

For example, a fourth embodiment of the present invention is a structure in which when the image sensor is the linear CCD 116 as shown in each of the above-described embodiments and the illuminating means of the present invention that corresponds to the image sensor is a lamp 32' including 2×7 light emitting portions 32A as shown in FIG. 16A, the illumination range is automatically changed by turning on, from among the light emitting portions 32A, a predetermined area as a lightening area 32B according to the type (size) of the photographic film, as shown in FIG. 16B.

FIG. 17A illustrates an example of a lamp 32", as a fifth embodiment of the present invention, in the case when the image sensor of the present invention is formed of the area CCD. In this case, too, as is the case with FIG. 16A described above, the illumination range can be changed by turning on, from among the light emitting portions 32A, a predetermined area as a lightening area 32B' according to the type (size) of the photographic film as shown in FIG. 17B.

Next, a description will be given of the sixth embodiment.

Figure 18:
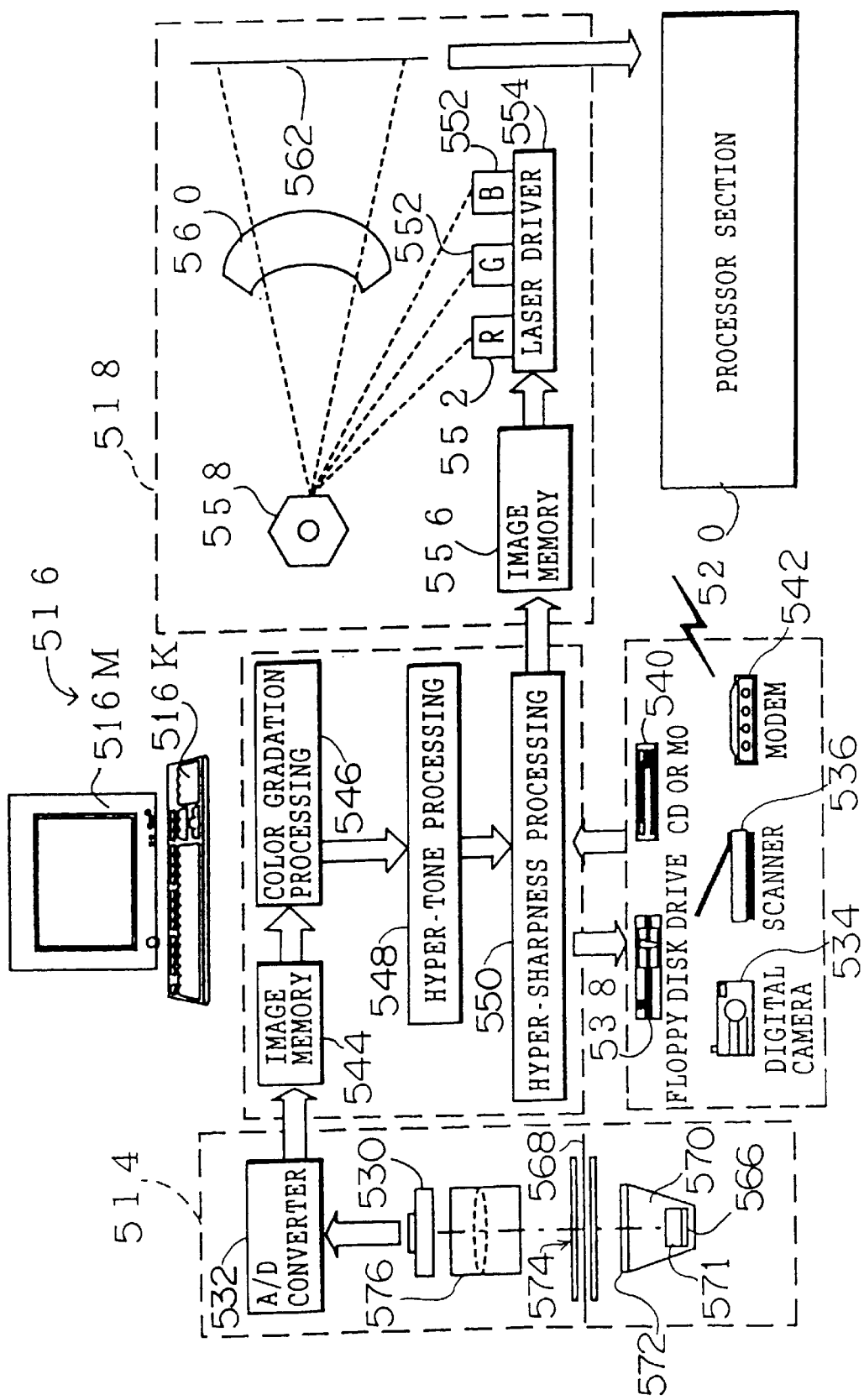
FIG. 18 is a schematic structural diagram of an image processing system relating to a sixth embodiment of the present invention.
Figure 19:
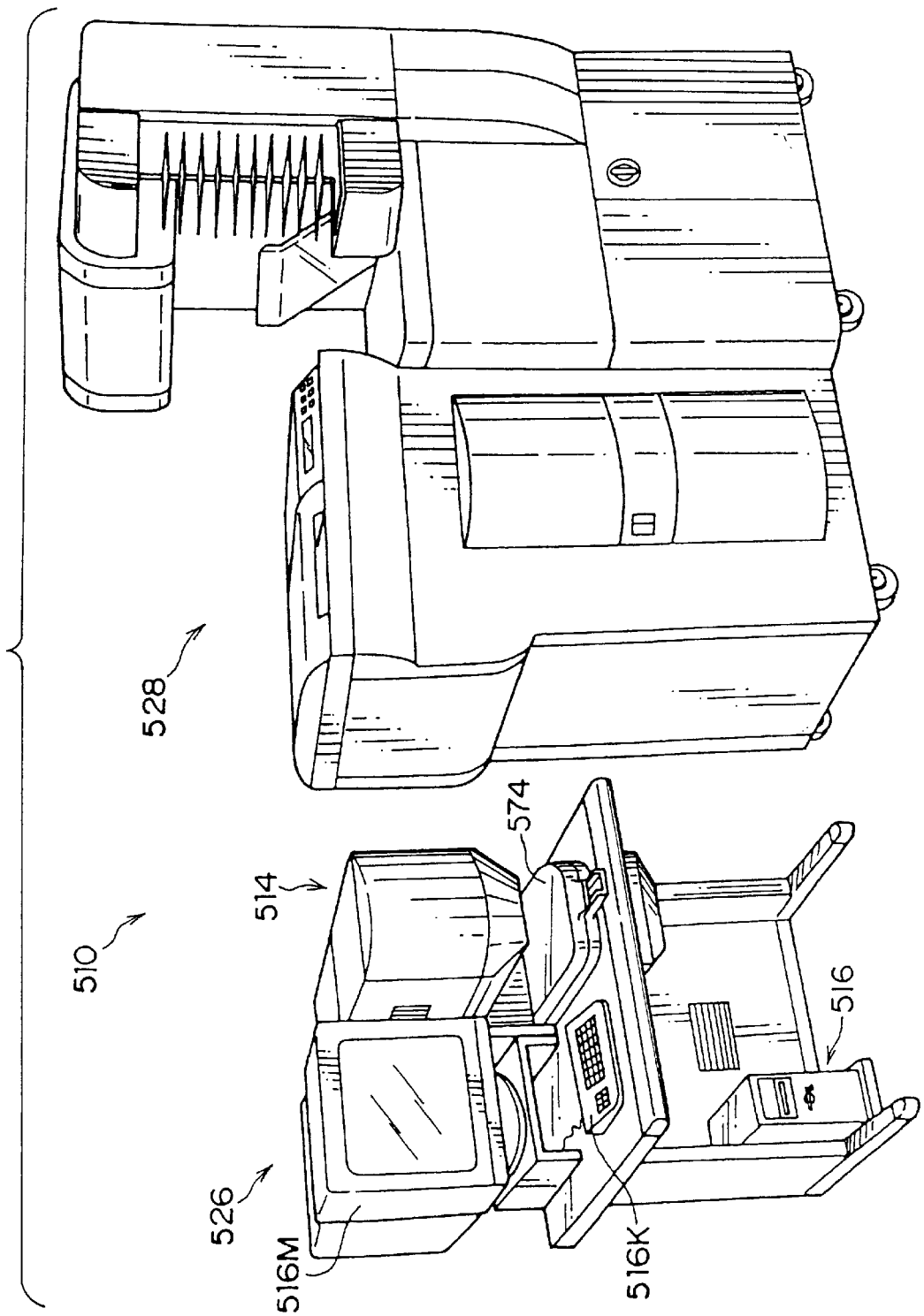
FIG. 19 is an outside view of the image processing system of the sixth embodiment.

As shown in FIG. 18, an image processing system 510 of the present embodiment is configured to include a film scanner 514, an image processing section 516, a laser printer section 518, and a processor section 520. The film scanner 514 and the image processing section 516 are integrated to form an input section 526 shown in FIG. 19, and the laser printer section 518 and the processor section 520 are integrated to form an output portion 528 shown in FIG. 19. It should be noted that the-film scanner 514 corresponds to the image reading device of the present invention.

The film scanner 514 is used to read a frame image recorded on a photographic film such as a negative film or a reversal film. Examples of the photographic film on which a frame image to be read is recorded include a 135 size photographic film, a 110 size photographic film, a photographic film with a transparent magnetic layer formed thereon (i.e., a 240 size photographic film: a so-called APS film), and 120 size and 220 size (Brownie size) photographic films. The film scanner 514 reads the frame image to be read, as described above, by an area CCD 530 and, after effecting A/D conversion in an A/D converting portion 532, outputs image data to the image processing section 516.

It should be noted that in the present embodiment, a description will be given of the image processing system 510 to which the 135 size photographic film and the Brownie size photographic film are applied.

The image processing section 516 is configured not only to allow input of the image data outputted from the film scanner 514 (i.e., scanned image data), but also to allow input of image data obtained by photographing using a digital camera 534 or the like, image data obtained by reading an original (for example, a reflection original or the like) by a scanner 536 (a flat-bed type), image data generated by another computer and recorded in a floppy disk drive 538, or a MO drive or CD drive 540, communication image data received via a modem 542, and the like from the outside.

The image processing section 516 stores the inputted image data in an image memory 544 so that image processings including various corrections and the like are effected in a color gradation processing portion 546, a hyper-tone processing portion 548, a hyper-sharpness processing portion 550, etc., and outputs the image data, as recording image data, to the laser printer section 518. Further, the image processing section 516 also can output the image data subjected to the image processing, as an image file; to the outside (for example, the image data can be outputted to a storage medium such as a FD, MO, CD-R or the like, or transmitted to the other information processing equipment via a communication line).

The laser printer section 518 includes laser light sources 552 of R, G, and B, and, by controlling a laser driver 554, causes laser light, modulated according to the recording image data inputted from the image processing section 516 (which is temporarily stored in the image memory 556), to be irradiated onto photographic printing paper so as to record an image on the photographic printing paper 562 by scan exposure processing (in the present embodiment, generally with an optical system in which a polygon mirror 558 and a fθ lens 560 are used). Further, the processor section 520 effects various processings including color development, bleach-fixing, washing, and drying on the photographic printing paper 562 on which the image is recorded by the scan exposure processing in the laser printer section 518. As a result, the image is formed on the photographic printing paper.

Structure of Film Scanner

Figure 20:
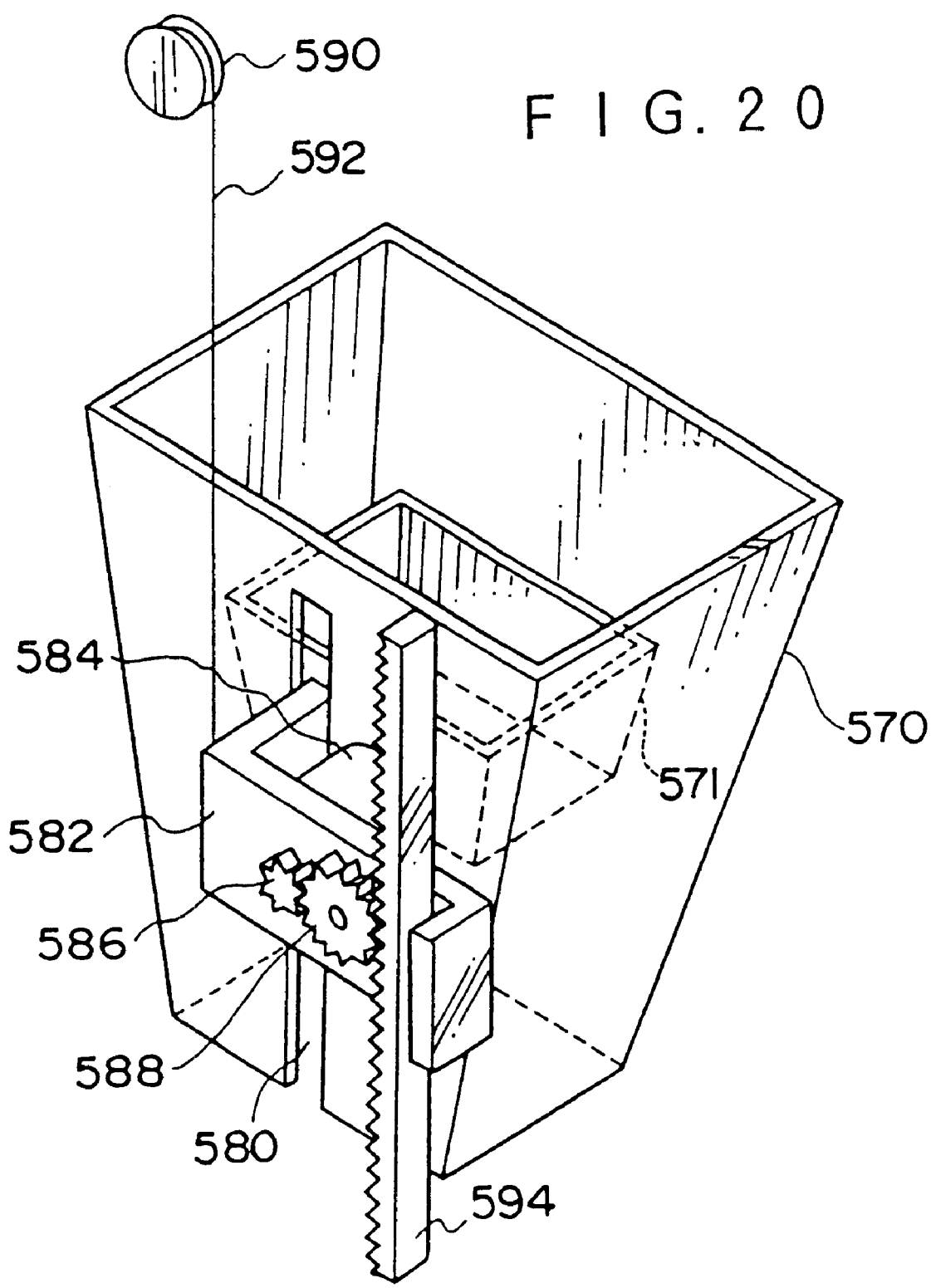
FIG. 20 is a perspective view illustrating a schematic structure of a diffusion box for a 135 size film and a diffusion box for a Brownie size film relating to the sixth aspect.

Next, a description will be given of the structure of the film scanner 514. The film scanner 514 includes a light source 566, which is comprised of a plurality of LEDs 564, for irradiating light onto a photographic film 568. As a light conductive member in which light to be irradiated onto the photographic film 568 is made into diffused light, a diffusion box for a 135 size film 571 is disposed at a light emission side of the light source 566. Then, as shown in FIG. 20, the diffusion box for a 135 size film 571 is provided in the interior of a diffusion box for a Brownie size film 570, and is configured in such a manner as to be movable by a movement mechanism (which will be described later) along the optical axis of the light emitted from the light source 566.

It should be noted that in the diffusion box for a 135 size film 571 and the diffusion box for a Brownie size film 570, surfaces other than light incident surfaces and light emitting surfaces are coated with a member having a reflectance of equal to or higher than 70%. For example, the coating member may be a solid member such as metal, or may be a thin film coating member such as a dielectric multi-layer film. Further, surfaces that are opposed to the photographic film 568 are formed in sizes larger than surfaces that are opposed to the light source 566. In other words, the diffusion box for a 135 size film 571 and the diffusion box for a Brownie size film 570 are formed to be trapezoids when seen in a side view. It should be noted that the diffusion box for a 135 size film 571 may not be a trapezoid when seen in a side view. For example, it may be a rectangle.

A lens unit 576, which allows the focusing of light transmitted through the frame image, and the area CCD 530 are disposed sequentially along the optical axis, at the side of the photographic film 568 opposite to the side at which the light source 566 is disposed. It should be noted that a SELFOC lens may be used as the lens unit 576. In this case, it is preferable that the respective end surfaces of the SELFOC lens are disposed as close as possible to the photographic film 568 and the area CCD 530.

The area CCD 530 is a monochrome CCD in which a plurality of CCD cells, each of which having sensitivity to the visible light range and the infrared range, are disposed in a matrix in the longitudinal and transverse directions of the photographic film 568. The area CCD 530 also includes a sensing portion equipped with an electronic shutter mechanism. The area CCD 530 is disposed in such a manner that a light receiving surface of each sensing portion coincides with the position of a focusing point of the lens unit 576.

Further, in the vicinity of the sensing portions, transferring portions are provided to correspond to the respective sensing portions, and electric charge accumulated in the CCD cells of the respective sensing portions is sequentially transferred via the corresponding transferring portions. Moreover, although an illustration thereof is omitted, a shutter is provided between the area CCD 530 and the lens unit 576.

Figure 21A:
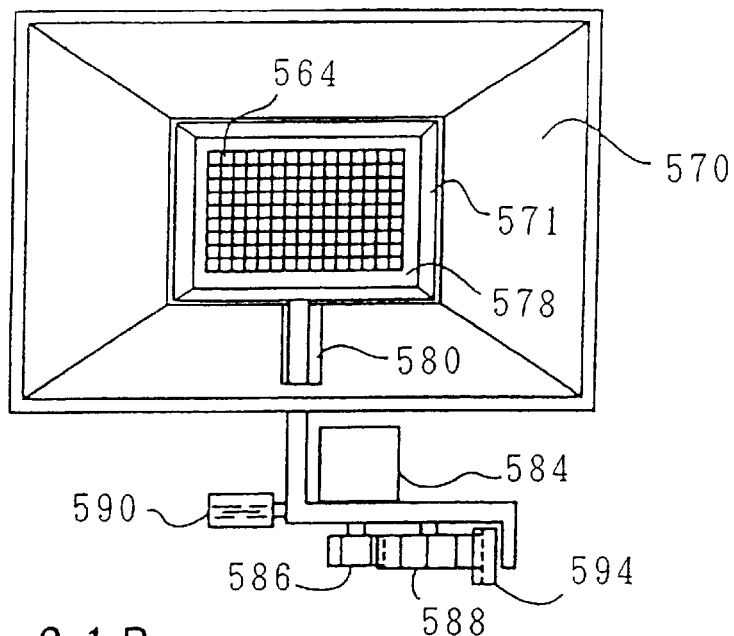
FIG. 21A is a plan view of the diffusion box for a 135 size film and the diffusion box for a Brownie size film.
Figure 21B:
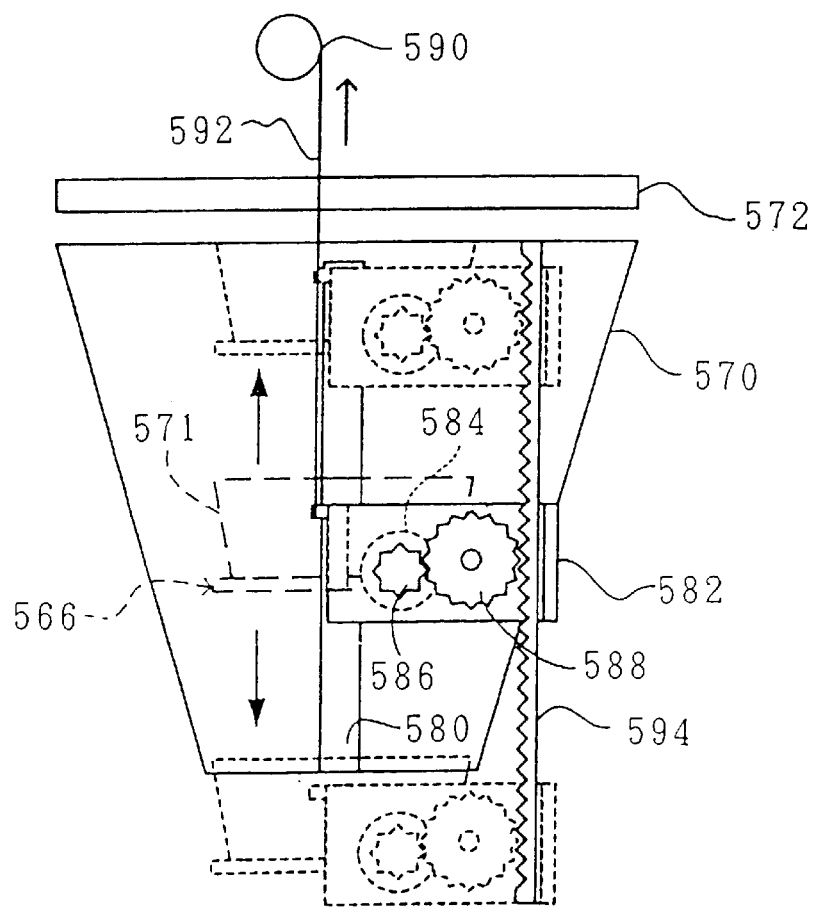
FIG. 21B is a side view of the diffusion box for a 135 size film and the diffusion box for a Brownie size film.

Next, referring to FIGS. 20, 21A and 21B, a description will be given of the above-mentioned movement mechanism of the diffusion box for a 135 size film 571 which moves inside the diffusion box for a Brownie size film 570. FIG. 20 is a perspective view illustrating a schematic structure of the diffusion box for a 135 size film 571 and the diffusion box for a Brownie size film 570. FIG. 21A is a plan view of FIG. 20 and FIG. 21B is a side view of FIG. 20.

As the light source 566, the LEDs 564 which output the respective light of red (R), green (G), and blue (B) (and the infrared light (IR)) are disposed on an aluminum substrate 578 in a matrix, and the aluminum substrate 578 is fixed at the diffusion box for a 135 size film 571.

As mentioned above, the diffusion box for a 135 size film 571 is configured in such a manner as to be movable inside the diffusion box for a Brownie size film 570 along the optical axis. At a side face of the diffusion box for a Brownie size film 570, a slot 580 is provided and a bracket 582 substantially in the shape of a crank is inserted into the slot 582. One end of the bracket 582 substantially in the shape of a crank is fixed at the diffusion box for a 135 size film 571. In other words, the diffusion box for a 135 size film 571 and the bracket 582 are configured in such a manner as to be movable along the slot 580.

The bracket 582 is provided with a motor 584 for moving the diffusion box for a 135 size film 571, and at a rotation axis of the motor 584, a pinion gear 586 is anchored through the bracket 582. Further, a gear 588 is provided adjacent to the pinion gear 586 so that the drive of the pinion gear 586 is transmitted to the gear 588. Moreover, a rack gear 594 is provided in such a manner as to be nipped by the gear 588 and the bracket 582 substantially in the shape of a crank. In other words, due to the rotation of the gear 588 via the pinion gear 586 caused by the rotational drive of the motor 584, as shown by dotted lines in FIG. 21B, the diffusion box for a 135 size film 571 is moved along the rack gear 594.

Further, a reel 590 including a plate spring (not illustrated) is provided above the bracket 582. One end of a filament-like line 592 is wound and anchored to the reel, and other end of the line is anchored to the bracket 582.

The plate spring is urged in the direction in which the line 592 is wound by the reel 590. In other words, components (the bracket 582, the pinion gear 586, the gear 588, the motor 584, and the like) that move with the diffusion box for a 135 size film 571 are held by the upward urge of the bracket 582 via the line 592. It should be noted that the urging force of the plate spring is such that the components that move with the diffusion box for a 135 size film 571 do not drop downward by their own weight, and the motor has greater driving force than that of the urging force. Further, a stopper may be provided so that the above components that move with the diffusion box for a 135 size film 571 will not go down due to their own weight.

Further, the film scanner 514 is equipped with a function of effecting various processings of darkness correction, density conversion, shading correction, defective pixel correction for the scan data inputted from the area CCD 530. The darkness correction is achieved by storing, for each of the cells, data inputted from the area CCD 530 in a state in which the light incident side of the area CCD 530 is cut off from light (that is, data which represents a darkness output level of each of the cells of the area CCD 530), and further, by subtracting the darkness output level of the cell corresponding to each pixel from the scan data inputted from the area CCD 530 after the photographic film 568 has been read by the area CCD 530.

The film scanner 514 includes a look-up table (LUT) in which data for carrying out logarithmic conversion is stored, and the above-mentioned density conversion is achieved by converting the data, on which darkness correction is carried out (the data represents an amount of incident light on the area CCD 530), into data which represents the density of the photographic film 568 that is set at the film scanner 514 by the above LUT. Further, data that is obtained by irradiating uniform light onto each of the cells of the area CCD 530 in a state in which a photographic film 568 is not set in the film scanner 514 (shading data) is stored. It should be noted that the shading data differs depending on the position of the diffusion box for a 135 size film 571, in other words, the position of the light source 566 that moves with the diffusion box for a 135 size film 571. Therefore, shading data is stored for each position of the light source 566. In the present embodiment, shading data is stored for two positions, i.e., the position for a 135 size film and the position for a Brownie size film.

The shading correction described above is achieved by correcting data, whose density has been converted, for each pixel based on the shading data when the photographic film 568 is read.

Moreover, the film scanner 514 is configured to allow detection of the appropriateness of the position of the diffusion box for a 135 size film 571 (the position of the light source 566) in the movement mechanism based on the above-described shading data by the amount of received light inputted to the area CCD 530.

Figure 22:
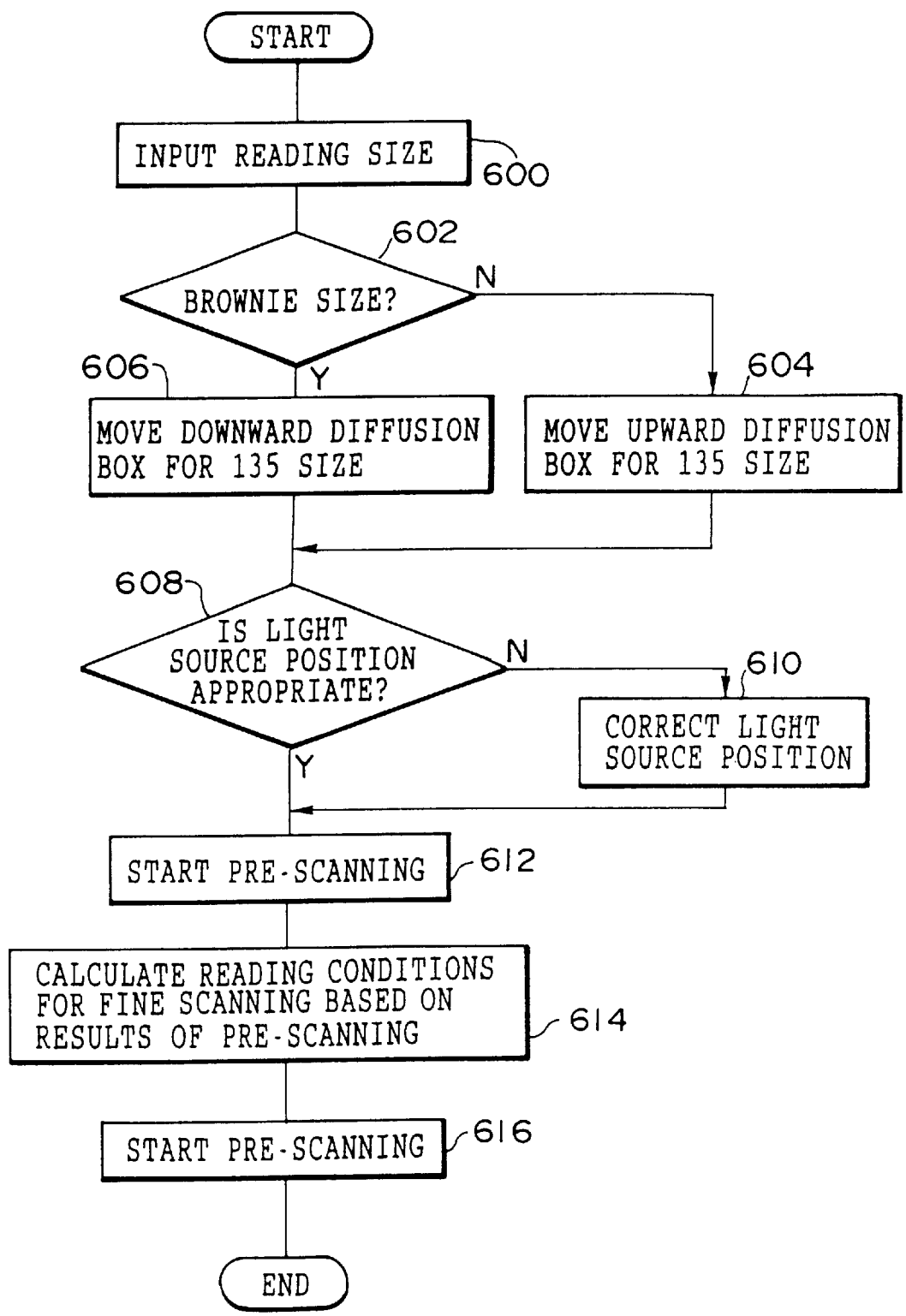
FIG. 22 is a flow chart illustrating a flow of reading processing.

Hereinafter, operation of the present embodiment will be described with reference to the flow chart shown in FIG. 22.

In step 600, an operator inserts the photographic film 568 into the film carrier 574 and inputs an instruction to start the processing of a frame image and the size of the photographic film 568 that has been set in the film carrier 574 by a keyboard 516K of the image processing section 516.

In step 602, it is determined whether the size of the photographic film 568 inputted in step 600 is a Brownie size or not. If the answer to the determination is negative, in other words, if it is determined that the reading size is a 135 size, the routine proceeds to step 604. In step 604, the motor 584 is driven so that the diffusion box for a 135 size film 571 is moved upward. Then, the routine proceeds to step 608.

If the answer to the determination in step 602 is affirmative, in other words, if it is determined that the reading size is Brownie size, the routine proceeds to step 606. In step 606, the motor is driven so that the diffusion box for a 135 size film 571 is moved downward. Then, the routine proceeds to step 608.

In step 608, it is determined whether the position of the light source 566 is appropriate or not, based on the amount of received light obtained by turning on the LEDs of the light source 566 so as to irradiate light onto the area CCD 530. If the answer to the determination is negative, the routine proceeds to step 610, in which the position of the light source 66 is adjusted to the appropriate one, and the routine proceeds to step 612. If the answer to the determination in the step 608 is affirmative, the routine proceeds to step 612 straightforwardly.

In step 612, the film carrier 574 starts conveying the photographic film 568 and the center of the frame image of the first frame recorded on the photographic film 568 is located in such a manner that the center thereof coincides with the center of the optical axis. Then, reading at a relatively low resolution (pre-scanning) is carried out for light of the respective colors (R, G, B, and IR) outputted from the LEDs 564 that are disposed at the light source 566.

When the pre-scanning of the first frame is completed, the subsequent frame image is conveyed by the film carrier 574 such that the center thereof coincides with the optical axis, and the pre-scanning is carried out for the subsequent frame image. In this way, pre-scanning is carried out for sequential frame images. It should be noted that the image that has been read is displayed on a monitor 516M, on which the image that has been read by pre-scanning can be checked.

In step 614, reading conditions for the time of fine scanning (reading at a relatively high resolution) are set for each frame image based on the results of the pre-scanning of each frame image. At this point in time, defective portions such as scratches and extraneous materials on the frame image are detected based on the results of reading with the IR light.

In step 616, when setting of the reading conditions for the time of fine scanning for all the frame images is completed, the photographic film 568 is conveyed in the reverse direction to the direction of the pre-scanning, and the last frame image is located in such a manner that the center thereof coincides with the center of the optical axis. Then, reading at a relatively high resolution or fine scanning is carried out for light of the respective colors (R, G, B, and IR) outputted from the LEDs 564 that are disposed at the light source 566.

When the fine scanning of the last frame is completed, the subsequent frame image is conveyed by the film carrier 574 such that the center thereof coincides with the optical axis, and the fine scanning is carried out for the subsequent frame image. In other words, fine scanning is carried out in the reverse direction to the direction of the pre-scanning, and R, G, B, and IR fine scanning is sequentially carried out for a frame image of the photographic film 568.

In this way, in the present embodiment, when the 135 size photographic film and the Brownie size photographic film are read, the operator does not need to change the diffusion box for the one corresponding to the photographic film, and, by moving the diffusion box for a 135 size film 571 inside the diffusion box for a Brownie size film 570 according to the size of the photographic film 568 which is read in step 604 or 606, a photographic film corresponding to each size can be read. Accordingly, the operation of changing diffusion boxes by the operator can be skipped, thereby allowing efficient reading of the image.

Further, by moving the diffusion box for a 135 size film 571 in the interior of the diffusion box for a Brownie size film 570, miniaturization of the apparatus can be attempted.

Figure 23:
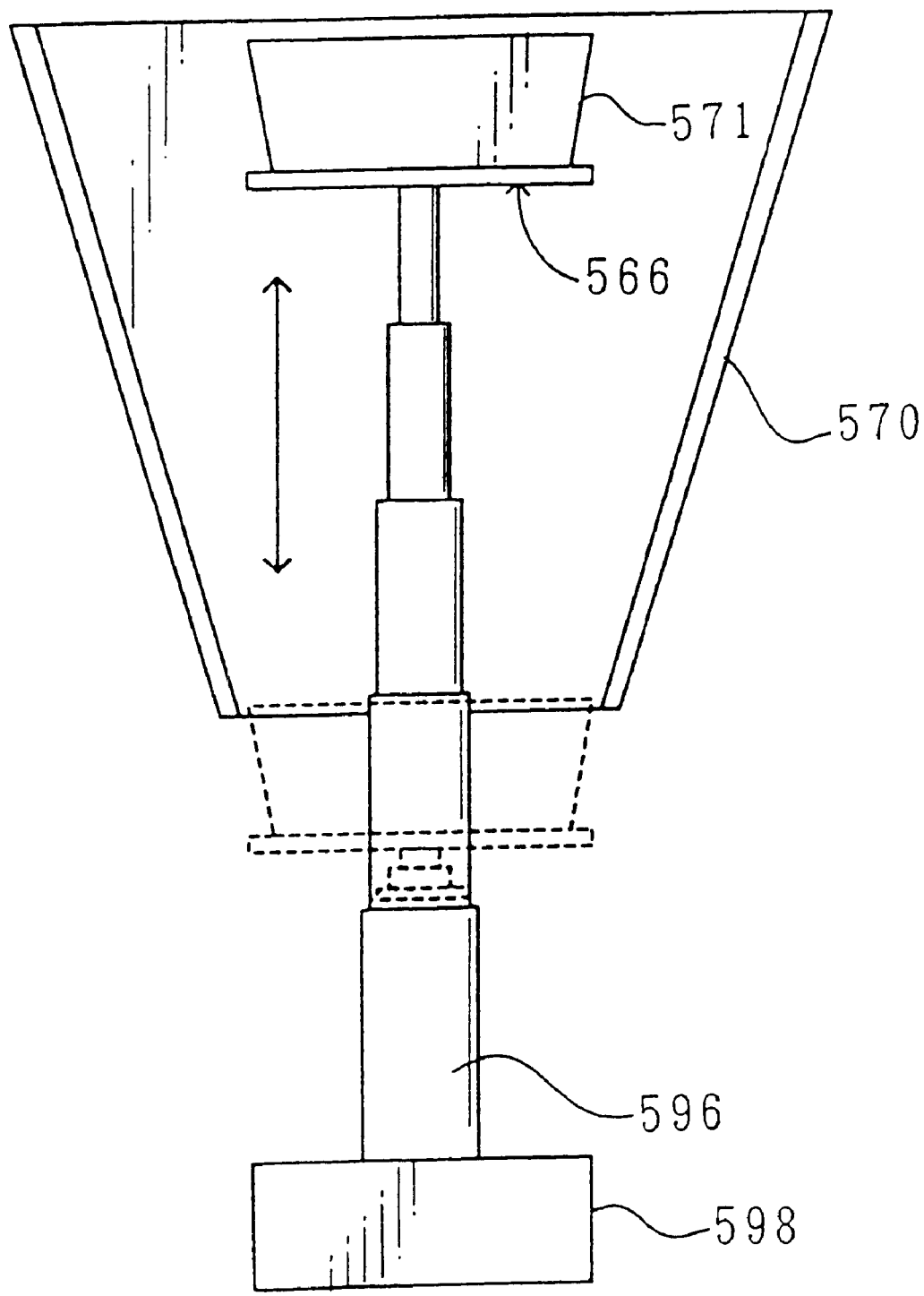
FIG. 23 is a diagram illustrating another movement mechanism of the diffusion box for a 135 size film.

It should be noted that, in the above embodiment, there has been described a case in which the mechanism that moves the diffusion box for a 135 size film 571 inside the diffusion box for a Brownie size film 570 along the optical axis is formed of the motor 584, the pinion gear 586, the gear 588, and the rack gear 594. However, the present invention is not limited to the same. For example, as shown in FIG. 23, a structure may be employed in which the light source 566 and the diffusion box for a 135 size film 571 are fixed at the top of a connecting arm 596 so that the movement of the diffusion box for a 135 size film 571 inside the diffusion box for a Brownie size film 570 along the optical axis is caused by expanding the connecting arm 596 using moving means 598 such as air pressure, oil pressure, or the like. Alternatively, an exciting or unexciting condition generated by a solenoid may be utilized for the movement of the diffusion box for a 135 size film 571 inside the diffusion box for a Brownie size film 570 along the optical axis.

Figure 24A:
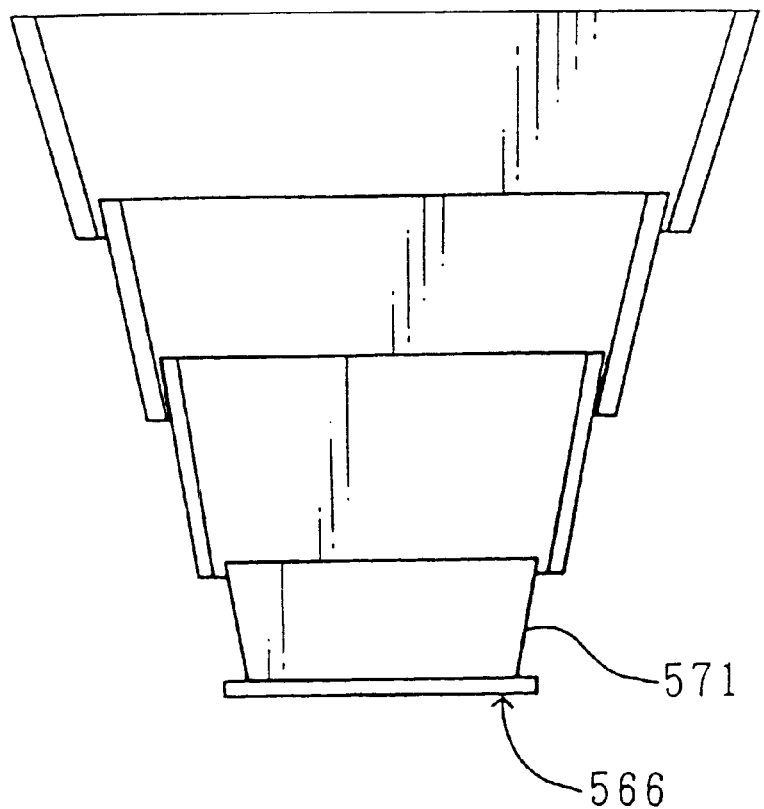
FIGS. 24A and 24B are diagrams illustrating another structure of the diffusion boxes.
Figure 24B:
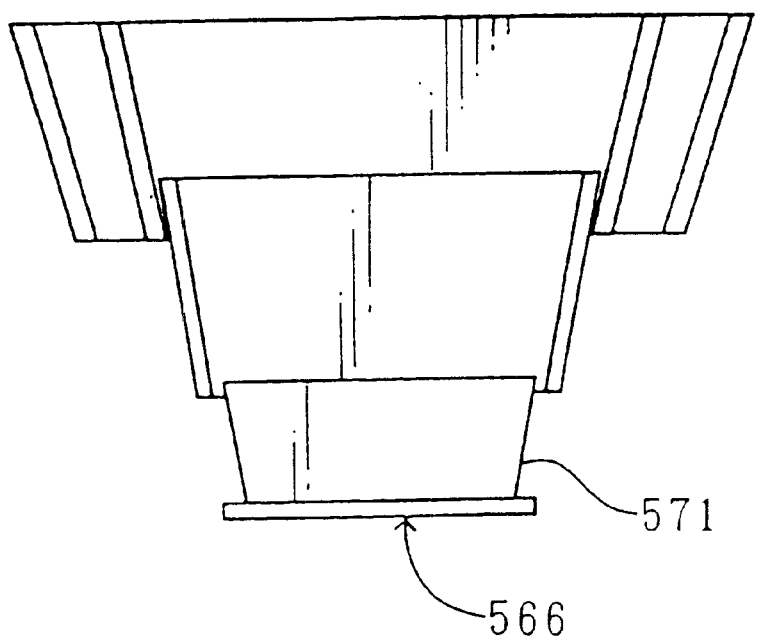

Further, in the above-described embodiment, there has been described a case in which the diffusion box for a 135 size film 571 is moved according to the 135 size photographic film and the Brownie size photographic film for reading. However, the present invention is not limited to the same, and a structure may be employed in which the position of the inner diffusion box that moves according to the photographic films of a plurality of sizes (in the present embodiment, the diffusion box for a 135 size film 571) is adjusted. In this case, for example, as shown in FIGS. 24A and 24B, a diffusion box situated outside (in the present embodiment, the diffusion box for a Brownie size film 570) is divided into many sections so that an area of an opening at a light emitting side of the outer diffusion box can be changed as the inner diffusion box is moved. By adjusting the area of the opening of the outer diffusion box so as to correspond to the position of the inner diffusion box, the amount of light outputted from the light source can be used efficiently.

Figure 25A:
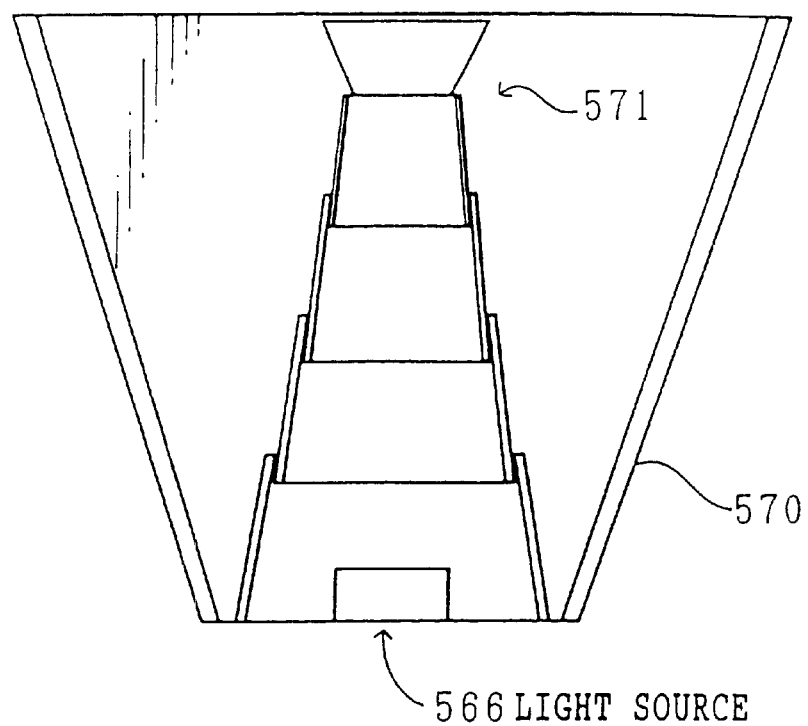
FIGS. 25A and 25B are diagrams illustrating an example of a structure of diffusion boxes whose light source is fixed.
Figure 25B:
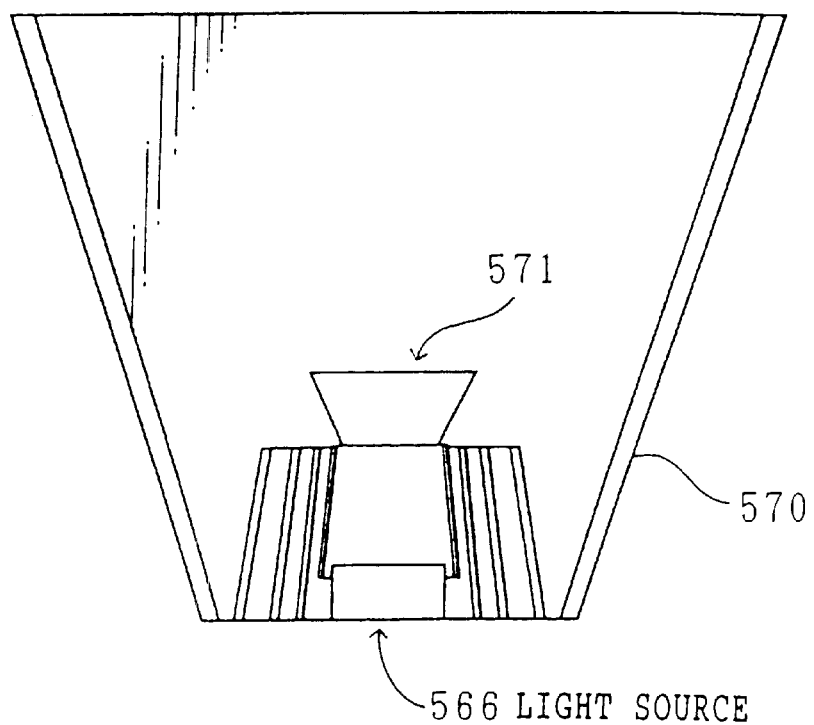

Further, in the above embodiment there has been described a case in which the light source 566 is moved as the diffusion box for a 135 size film 571 moves. However, the present invention is not limited to the same, and a structure may be employed in which, as shown in FIGS. 25A and 25B, the light source 566 is fixed at the light incident side of the outer diffusion box (in the present embodiment, the diffusion box for a Brownie size film 570), and the inner diffusion box (in the present embodiment, the diffusion box for a 135 size film 571) is divided into many sections in the same manner as the outer diffusion box in FIGS. 24A and 24B so that a distance from the light source 566 is adjusted by moving the inner diffusion box (the diffusion box for a 135 size film 571) according to the photographic films of a plurality of sizes.

Moreover, in the sixth embodiment described above, there has been described a case in which the reading of the image is carried out by the area CCD 530. However, the present invention is not limited to the same, and, as in the case with the first embodiment, the linear CCD may be employed.

What is claimed is:

1. An image reading apparatus comprising:
    illuminating means for illuminating an original to be read;
    changing means for changing automatically one of an illumination area-and a degree of diffusion of the illuminating means according to reading conditions of the original to be read;
    a lens for focussing the original to be read;
    an image sensor for separating an image of the original to be read, which is obtained through the lens, into a plurality of pixels for reading and outputting as image data;
    wherein the reading conditions are one of:
        a size of the original to be read; and
        whether printing comprises a simultaneous film processing or a reprinting when the original to be read is a photosensitive material.

2. An image reading apparatus according to claim 1, wherein the changing means comprises:
    light diffusing means whose outer periphery is structured in the form of a hollow structure with four side walls comprising a pair of first side walls and a pair of second side walls whose respective upper end portions are movable toward and apart from each other, and which makes illumination light generated by the illuminating means into diffused light; and
    controlling means for changing the illumination range automatically by effecting control such that the respective upper end portions of the second side walls are moved according to a type of the original to be read.

3. An image reading apparatus according to claim 2, wherein the pair of first side walls is structured such that the respective upper end portions thereof are movable toward and apart from each other, and the controlling means effects control such that the respective upper end portions of the pair of first side walls are moved in a direction in which they move apart from each other before the second side walls are moved, and the respective upper end portions of the pair of first side walls are moved in a direction in which they move toward each other after the second side walls has been moved.

4. An image reading apparatus comprising:
    illuminating means for illuminating an original to be read;
    changing means for changing automatically one of an illumination area and a degree of diffusion of the illuminating means according to reading conditions of the original to be read;
    a lens for focussing the original to be read;
    an image sensor for separating an image of the original to be read, which is obtained through the lens, into a plurality of pixels for reading and outputting as image data;
    wherein the changing means comprises:
        a plurality of light diffusing means, each having one of a different illumination range and degree of diffusion, in which illumination light generated by the illuminating means is made into diffused light; and
        controlling means for changing one of the illumination range and the degree of diffusion automatically by effecting control such that the light diffusing means corresponding to a type of the original to be read is chosen from among the plurality of light diffusing means and the chosen light diffusing means is located on one of an optical axis and an optical path.

5. An image reading apparatus according to claim 4, further comprising a plurality of conveying means, each of which is provided for each type of original to be read, for conveying the original to be read in such a manner that the original to be read passes a position at which the image sensor carries out a reading, wherein the controlling means chooses the light diffusing means corresponding to the type of the original to be read by detecting one of the type of the original to be read and the type of the conveying means.

6. An image reading apparatus according to claim 5, wherein the controlling means causes the chosen light diffusing means to move, thereby allowing the chosen light diffusing means to be located on one of the optical axis and the optical path.

7. An image reading apparatus according to claim 4, wherein the controlling means causes the chosen light diffusing means to move, thereby allowing the chosen light diffusing means to be located on one of the optical axis and the optical path.

8. An image reading apparatus according to claim 4, wherein the image sensor is a linear CCD.

9. An image reading apparatus according to claim 4, wherein the diffusing means is a diffusion box.

10. An image reading apparatus comprising:
    illuminating means for illuminating an original to be read;
    changing means for changing automatically one of an illumination area and a degree of diffusion of the illuminating means according to reading conditions of the original to be read;
    a lens for focussing the original to be read;
    an image sensor for separating an image of the original to be read, which is obtained through the lens, into a plurality of pixels for reading and outputting as image data;
    wherein the reading conditions are one of:
        a size of the original to be read;
        whether printing comprises a simultaneous film processing or a reprinting when the original to be read is a photosensitive material;
    wherein the changing means comprises:
        a plurality of light diffusing means, each having one of a different illumination range and degree of diffusion, in which illumination light generated by the illuminating means is made into diffused light; and
        controlling means for changing one of the illumination range and the degree of diffusion automatically by effecting control such that the light diffusing means corresponding to a type of the original to be read is chosen from among the plurality of light diffusing means and the chosen light diffusing means is located on one of an optical axis and an optical path.

11. An image reading apparatus according to claim 10, further comprising a plurality of conveying means, each of which is provided for each type of original to be read, for conveying the original to be read in such a manner that the original to be read passes a position at which the image sensor carries out a reading, wherein the controlling means chooses the light diffusing means corresponding to the type of the original to be read by detecting one of the type of the original to be read and the type of the conveying means.

12. An image reading apparatus comprising:

illuminating means for illuminating an original to be read;

changing means for changing automatically one of an illumination area and a degree of diffusion of the illuminating means according to reading conditions of the original to be read;

a lens for focussing the original to be read;

an image sensor for separating an image of the original to be read, which is obtained through the lens, into a plurality of pixels for reading and outputting as image data;

wherein the illuminating means includes a plurality of light emitting portions and the changing means causes the illumination range to change automatically by changing the number of the light emitting portions that emit light from the plurality from light emitting portions.

13. An image reading apparatus according to claim 12, wherein the plurality of light emitting portions are arranged in two dimensions, and the changing means causes the illumination range to change automatically by changing the number of the light emitting portions that emit light in two dimensions.

14. An image reading apparatus according to claim 12, wherein the plurality of light emitting portions are arranged in lines, and the changing means causes the illumination range to change automatically by changing a number of the light emitting portions that emit light linearly.

15. An image reading apparatus comprising:

illuminating means for illuminating an original to be read;

changing means for changing automatically one of an illumination area and a degree of diffusion of the illuminating means according to reading conditions of the original to be read;

a lens for focussing the original to be read;

an image sensor for separating an image of the original to be read, which is obtained through the lens, into a plurality of pixels for reading and outputting as image data;

wherein the changing means comprises:

a plurality of diffusion boxes for converting the light from the illuminating means into diffused light so that the original to be read is illuminated by the diffused light; and moving means for selectively moving the plurality of diffusion boxes on an optical path of the light from the illuminating means.

16. An image reading apparatus comprising:

illuminating means for illuminating an original to be read;

changing means for changing automatically one of an illumination area and a degree of diffusion of the illuminating means according to reading conditions of the original to be read;

a lens for focussing the original to be read;

an image sensor for separating an image of the original to be read, which is obtained through the lens, into a plurality of pixels for reading and outputting as image data;

wherein the changing means comprises:

a first diffusion box for converting light from the illuminating means into diffused light so that the original to be read is illuminated by the diffused light; and a second diffusion box for converting the light from the illuminating means into diffused light so that the original to be read is illuminated by the diffused light, which is disposed in such a manner as to be movable with the illuminating means inside the first diffusion box along the optical axis of the light outputted from the illuminating means.

17. An image reading apparatus for irradiating light outputted from a light source onto an original so as to read light transmitted through the original or light reflected by the original by a photoelectric transfer element, comprising:

a plurality of diffusion boxes for converting the light outputted from the light source into diffused light so as to irradiate the diffused light onto an area of the original to be read; and moving means for selectively moving the plurality of diffusion boxes on an optical path of the light outputted from the light source.

18. An image reading apparatus according to claim 15, wherein the light source comprises an LED element.

19. An image reading apparatus for irradiating light outputted from a light source onto an original so as to read light transmitted through the original or light reflected by the original by a photoelectric transfer element, comprising:

a first diffusion box for converting the light outputted from the light source into diffused light so as to irradiate the diffused light onto an area of the original to be read; and a second diffusion box for converting the light outputted from the light source into diffused light so as to irradiate the diffused light onto the original to be read, which is disposed in such a manner as to be movable with the light source inside the first diffusion box along the optical axis of the light outputted from the light source.

20. An image reading apparatus according to claim 19, wherein the light source comprises an LED element.

21. An image reading apparatus comprising:

a light source;

a control circuit which automatically changes a diffusion condition of the light source according to a reading condition for an original to be illuminated by said light source.

22. The image reading apparatus according to claim 21, wherein the control circuit changes the diffusion condition of the light source according to reading conditions comprising one of:

a size of the original to be read;

a speed and resolution at which the original is to be read; and whether the original to be read is subjected to reprinting or simultaneous film processing.

23. The image reading apparatus according to claim 22, further comprising a light diffusion device controlled by said control circuit, wherein said light diffusion device comprises four side walls including a first pair of side walls and a second pair of side walls and having respective upper end portions that are movable toward and apart from each other, and wherein the control circuit changes the diffusion of the light source by adjusting relative positions of the upper end portions based on reading conditions.

24. The image reading apparatus according to claim 22, further comprising a plurality of light diffusing devices, each of said light diffusing devices having a different illumination range and degree of diffusion, and wherein the control circuit disposes at least one of said plurality of light diffusing devices in a path of said light source based on the reading conditions for the original.

25. An image reading apparatus comprising:

illuminating means for illuminating an original to be read;

changing means for changing automatically one of an illumination area and a degree of diffusion of the illuminating means according to reading conditions of the original to be read;

a lens for focussing the original to be read;

an image sensor for separating an image of the original to be read, which is obtained through the lens, into a plurality of pixels for reading and outputting as image data.

26. An image reading apparatus comprising:

illuminating means for illuminating an original to be read;

changing means for changing automatically an illumination area of the illuminating means according to reading conditions of the original to be read;

a lens for focussing the original to be read;

an image sensor for separating an image of the original to be read, which is obtained through the lens, into a plurality of pixels for reading and outputting as image data.

27. An image reading apparatus comprising:

illuminating means for illuminating an original to be read;

changing means for changing automatically one of an illumination area and a degree of diffusion of the illuminating means according to reading conditions of the original to be read;

a lens for focussing the original to be read;

an image sensor for separating an image of the original to be read, which is obtained through the lens, into a plurality of pixels for reading and outputting as image data;

wherein the changing means comprises:

light diffusing means whose outer periphery is structured in the form of a hollow structure with four side walls comprising a pair of first side walls and a pair of second side walls whose respective upper end portions are movable toward and apart from each other, and which makes illumination light generated by the illuminating means into diffused light; and controlling means for changing the illumination range automatically by effecting control such that the respective upper end portions of the second side walls are moved according to a type of the original to be read.

28. An image reading apparatus according to claim 27, wherein the pair of first side walls is structured such that the respective upper end portions thereof are movable toward and apart from each other, and the controlling means effects control such that the respective upper end portions of the pair of first side walls are moved in a direction in which they move apart from each other before the second side walls are moved, and the respective upper end portions of the pair of first side walls are moved in a direction in which they move toward each other after the second side walls has been moved.

* * * * *